US011199516B2

(12) United States Patent
Ranganathan et al.

(10) Patent No.: US 11,199,516 B2
(45) Date of Patent: Dec. 14, 2021

(54) MEASUREMENT CIRCUITRY FOR EVALUATING A RESISTANCE OF A RESISTIVE GAS SENSOR

(71) Applicant: ams International AG, Rapperswil (CH)

(72) Inventors: Rohit Ranganathan, Telangana (IN); Sanjeev Praphulla Chandra Nyshadham, Pithapuram (IN); Krishna Kanth Avalur, Hyderabad (IN); Ravi Kumar Adusumalli, Telangana (IN); Prasad Ponnada, Andhrapradesh (IN)

(73) Assignee: AMS INTERNATIONAL AG, Rapperswil (CH)

( * ) Notice: Subject to any disclaimer, the term of this patent is extended or adjusted under 35 U.S.C. 154(b) by 360 days.

(21) Appl. No.: 16/337,498

(22) PCT Filed: Sep. 6, 2017

(86) PCT No.: PCT/EP2017/072346
§ 371 (c)(1),
(2) Date: Mar. 28, 2019

(87) PCT Pub. No.: WO2018/059894
PCT Pub. Date: Apr. 5, 2018

(65) Prior Publication Data
US 2020/0033284 A1    Jan. 30, 2020

(30) Foreign Application Priority Data
Sep. 30, 2016 (EP) .................................... 16191839

(51) Int. Cl.
*G01N 27/12* (2006.01)
(52) U.S. Cl.
CPC ................................. *G01N 27/122* (2013.01)

(58) Field of Classification Search
CPC .... G01N 27/122; G01N 27/121; G01N 27/18; G01N 27/028; G01N 27/045; G01N 25/18
See application file for complete search history.

(56) References Cited

U.S. PATENT DOCUMENTS

| 4,169,708 A | 10/1979 | Muggli |
| 4,907,441 A | 3/1990 | Shurmer |

(Continued)

FOREIGN PATENT DOCUMENTS

| CN | 1685222 A | 10/2005 |
| CN | 102735716 A | 10/2012 |
| EP | 2921850 | 9/2015 |

OTHER PUBLICATIONS

Barrettino, D. et al.: "A smart single-chip microhotplate- based chemical sensor system in CMOS-technology" 2002 IEEE International Symposium on Circuits and Systems. Proceedings (CAT.N0. 02CH37353), Jan. 1, 2002 (Jan. 1, 2002), pp. II-157.

(Continued)

*Primary Examiner* — Suman K Nath
(74) *Attorney, Agent, or Firm* — MH2 Technology Law Group LLP

(57) ABSTRACT

A measurement circuitry (MC) for evaluating a resistance of a resistive gas sensor (GS) comprises a first current path (P1), wherein a first logarithmic compression circuit (LC1) is arranged in the first current path (P1). A reference resistor (Rreference) and a second logarithmic compression circuit (LC2) is arranged in a second current path (P2) of the measurement circuitry (MC). A voltage generator (VG) provides a fixed voltage excitation for the resistive gas sensor (GS) and the reference resistor (Rreference). A first current (I1) received from the resistive gas sensor (GS) flows from the gas sensor (GS) via the first current path (P1) into the first logarithmic compression circuit (LC1). An (Continued)

evaluation circuit (EC) determines the resistance (Rs) of the resistive gas sensor (GS) in dependence on a first and second output signal (Ve1, Ve2) of the first and the second logarithmic compression circuit (LC1, LC2).

12 Claims, 15 Drawing Sheets

(56) References Cited

U.S. PATENT DOCUMENTS

| | | | |
|---|---|---|---|
| 5,184,500 | A | 2/1993 | Krcma et al. |
| 6,642,500 | B2 | 11/2003 | Takahashi |
| 7,310,656 | B1 | 12/2007 | Gilbert |
| 2002/0176067 | A1 | 11/2002 | Charbon |
| 2004/0075140 | A1 | 4/2004 | Baltes et al. |
| 2011/0138908 | A1* | 6/2011 | Liu .................. G01N 27/223 73/335.04 |
| 2014/0340100 | A1 | 11/2014 | Popa et al. |
| 2018/0136182 | A1* | 5/2018 | Wang .................. G01N 33/0073 |

OTHER PUBLICATIONS

Barrettino, D. et al.: "A smart Single-Chip Micro-Hotplate-Based Gas Sensor System in CMOS Technology" Analog Integrated Circuits and Signal Processing, Kluwer Academic Publishers, Technical Fields Bo, Searched (IPC) vol. 39, No. 3, Jun. 1, 2004 (Jun. 1, 2004), pp. 275-287.

Barrettino, D. et al.: "CMOS Monolithic Metal-Oxide Gas Sensor Microsystems" IEEE Sensors Journal, vol. 6, No. 2, Apr. 2006.

Grassi, M. et al.: "A 160dB Equivalent Dynamic Range Auto-Scaling Interface for Resistive Gas Sensors Arrays" IEEE Journal of Solid-State Circuits • Apr. 2007; DOI: 0.1109/JSSC.2006.891724; Retrieved on: Oct. 10, 2016.

Lombardi, A. et al.: "A Fully Integrated Interface Circuit for 1.5 degrees C Accuracy Temperature Control and 130-dB Dynamic-Range Read-Out of MOX Gas Sensors" Source: IEEE Xplore Conference Paper • Oct. 2008, DOI: 10.1109/ESSCIRC.2008.4681796, Retrieved on: Oct. 10, 2016.

Paul, S. et al.: "A Fast Hardware Approach for Approximate, Efficient Logarithm and Antilogarithm Computations" IEEE Transactions on Very Large Scale Integration (VLSI) Systems, vol. 17, No. 2, Feb. 2009, p. 269-277.

Pertijs, M. et al.: "Precision Temperature Measurement Using CMOS Substrate PNP Transistors" IEEE Sensors Journal, vol. 4, No. 3, Jun. 2004, p. 294-300.

European Patent Office, International Search Report for PCT/EP2017/072346 dated Nov. 17, 2017.

Chinese Search Report in corresponding Chinese Application No. 2017800610521 dated Feb. 5, 2021, 2 pages.

* cited by examiner

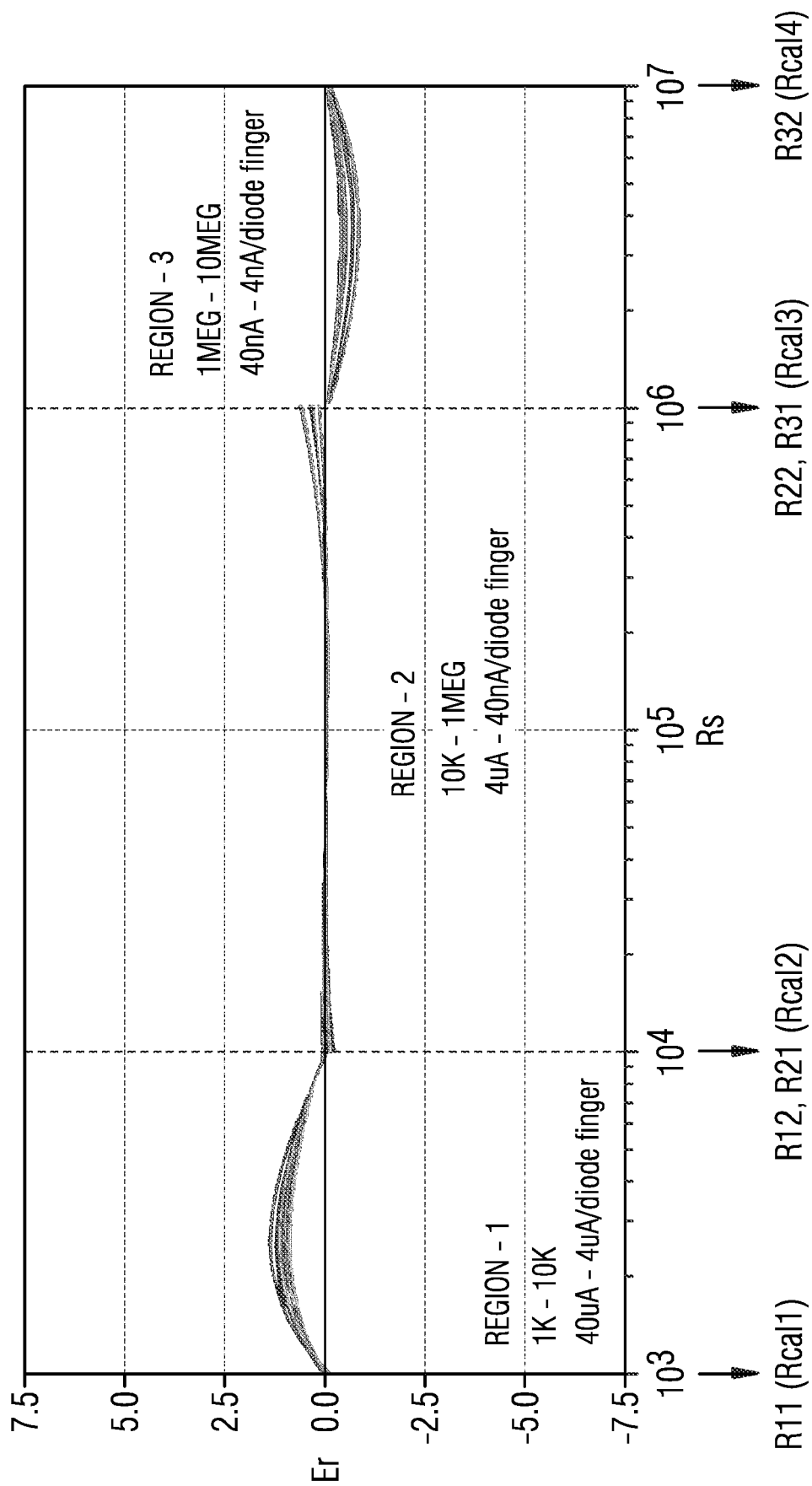

MEASUREMENT CIRCUITRY FOR EVALUATING A RESISTANCE OF A RESISTIVE GAS SENSOR

TECHNICAL FIELD

The invention relates to the field of building a wide dynamic range gas-sensor measurement circuitry, for example a circuitry having a sensor current of a factor 10000 to 50000 between its minimum and maximum current range, such as a sensor current from the nA- to mA-range. In particular, the invention relates to a measurement circuitry for evaluating an output signal of a resistive gas sensor.

BACKGROUND

A resistive gas sensor is usually used to detect the presence of particular gas components, for example to monitor environmentally relevant gases such as carbon monoxide and methane, in an atmosphere to which the gas sensor is exposed. Commonly used chemical-sensitive materials for detecting the gas components to which a resistive gas sensor is exposed are oxides, for example metal-oxides such as tin-oxide, tungsten-oxide or indium-oxides. The oxides are characterized by considerable resistance changes in dependence on the availability of particular gas components in the gas atmosphere.

A measurement circuitry/interface for evaluating the resistance of a resistive gas sensor detects an output signal of the sensor. The output signal may be a sensor current or voltage that is evaluated by the measurement circuitry to deduce to the resistance/resistance change of the resistive gas sensor and to determine the components included in a gaseous atmosphere. The measurement of the sensor resistance shows multiple dependencies on various parameters including the accurate thermal voltage of the measurement circuitry for any given junction temperature, an ADC (Analog To Digital Converter) reference voltage value error due to process variation, a drift of the ADC reference voltage with temperature, a drift of the ADC reference voltage with lifetime, etc. In particular, in a low voltage supply environment, the design of a measurement circuitry for evaluating an output signal of a resistive gas sensor is very complicated due to the plurality of parameters that distort the measurement of the actual resistance value of a resistive gas sensor.

It is desirable to provide a measurement circuitry for evaluating a resistance of a resistive gas sensor nearly without that the measurement/calculation of the resistance of the resistive gas sensor is influenced by disturbing parameters of the components of the measurement circuitry and, wherein the measurement circuitry may be used in a low voltage supply environment.

SUMMARY

An embodiment of a measurement circuitry for evaluating a resistance of a resistive gas sensor is specified in claim 1.

The measurement circuitry comprises an input terminal for connecting the measurement circuitry to the resistive gas sensor. The measurement circuitry further comprises a first current path and a second current path. The input terminal is arranged in the first current path. The reference resistor is arranged in the second current path. The measurement circuitry further comprises a voltage generator to provide a fixed voltage excitation for the resistive gas sensor and the reference resistor.

The measurement circuitry comprises a first logarithmic compression circuit being arranged in the first current path such that a first current flows from the resistive gas sensor to the input terminal and via the first current path into the first logarithmic compression circuit. The measurement circuitry comprises a second logarithmic compression circuit being arranged in the second current path such that a second current flowing through the reference resistor flows into the second logarithmic compression circuit. The measurement circuitry further comprises an evaluation circuit to determine the resistance of the resistive gas sensor.

The first logarithmic compression circuit is configured to generate a first output signal in dependence on the first current. The second logarithmic compression circuit is configured to generate a second output signal in dependence on the second current. The evaluation circuit is configured to determine the resistance of the resistive gas sensor in dependence on the first and second output signal.

The measurement circuitry for evaluating the resistance of the resistive gas sensor is a wide-range gas sensor interface that can excite the gas sensor/transducer using a voltage signal and compress the signal current received at the input terminal from the resistive gas sensor logarithmically to handle the ultra-wide range of operation. The resistive gas sensor may be excited using a voltage reference with reference to supply potential or with reference to ground potential. By exciting the sensor with reference to a supply potential, the first current that is received from the sensor, i.e. the sensor current, directly flows from the resistive gas sensor in the logarithmic compression circuit using a p-n junction that may built in a standard CMOS process. A current mirror for mirroring the sensor current in the first current path and thus in the logarithmic compression circuit is not necessary. The current mismatch error of wide dynamic range current mirrors is eliminated here.

The resistive gas sensor comprises a resistor having a resistance being dependent on a gaseous component in a gaseous atmosphere to which the resistive gas sensor is exposed. The measurement circuitry may be implemented on/in a substrate of a chip. The resistive gas sensor and thus the resistor of the resistive gas sensor is arranged off-chip, whereas the reference resistor is arranged on-chip. The reference resistor may be coupled and thus refer to the supply potential. The resistive gas sensor/the resistor of the resistive gas sensor and the reference resistor on-chip may simultaneously be excited to measure/calculate the sensor resistance relative to the resistance of the on-chip reference resistor. Simultaneous excitation of the resistive gas sensor/transducer and the on-chip reference resistor eliminates instantaneous errors due to coupling from supply potential, ground potential etc.

The measurement circuitry may be configured to determine the resistance of the resistive gas sensor in dependence on a differential/difference signal having a level in dependence on the difference between the first output signal (of the first logarithmic compression circuit) and the second output signal (of the second logarithmic compression circuit). Since the measurement circuitry determines the resistance of the resistive gas sensor based on a differential/difference signal instead of a signal with reference to the supply or the ground potential, the presented approach of the measurement circuitry for evaluating the resistance of the resistive gas sensor makes the design immune to noise.

The measurement circuitry may comprise an ADC (Analog To Digital Converter) to change the analog differential/difference signal to a digital output signal. The measurement circuitry is configured to determine the resistance of the gas sensor by a ratiometric measurement that makes the determination of the resistance of the resistive gas sensor invariant to a voltage reference of the ADC of the measurement circuitry.

BRIEF DESCRIPTION OF THE DRAWINGS

FIG. 13 shows the percentage measurement error for a sensor resistance in a range from 1 Kohms to 10 MOhms using a range-wise curvature and offset calibration technique.

DETAILED DESCRIPTION

The proposed measurement circuitry for evaluating a resistance of a resistive gas sensor will now be described in more detail hereinafter with reference to the accompanying drawings showing different embodiments of the measurement circuitry. The measurement circuitry may, however, be embodied in many different forms and should not be construed as limited to the embodiments set forth herein; rather, these embodiments are provided so that the disclosure will fully convey the scope of the measurement circuitry to those skilled in the art. The drawings are not necessarily drawn to scale but are configured to clearly illustrate the design of the measurement circuitry.

Figure 1:
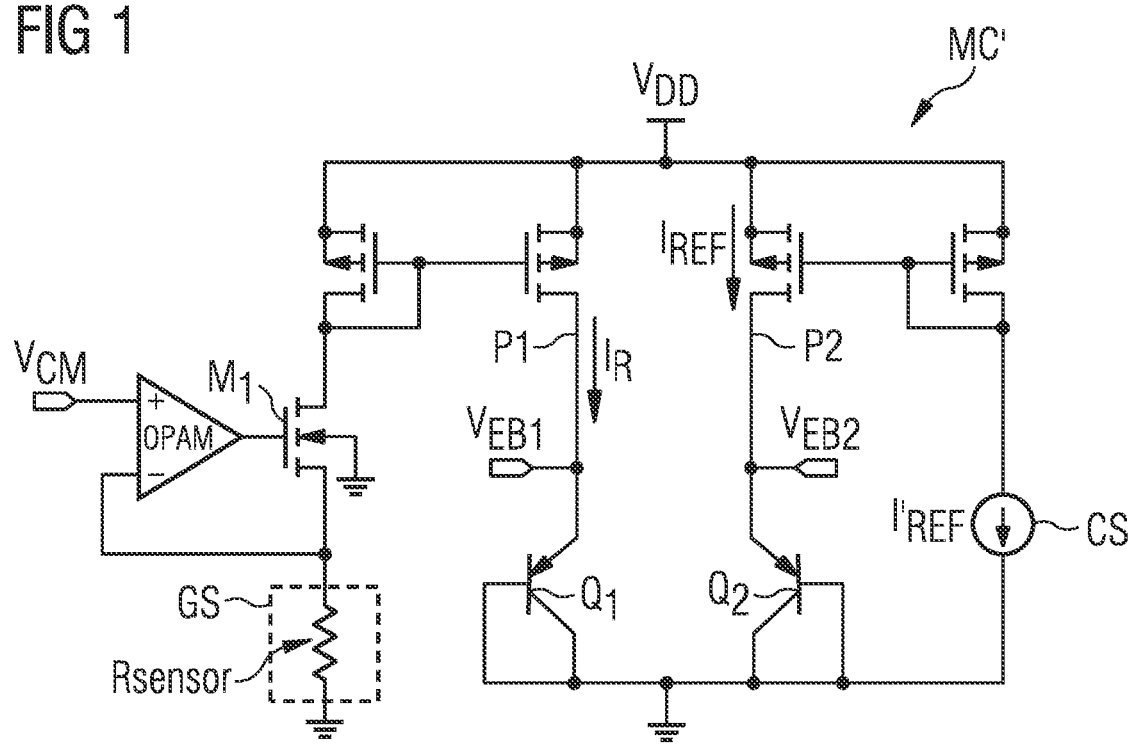
FIG. 1 shows a conventional measurement circuitry for evaluating a resistance of a resistive gas sensor.

In order to determine the resistance of a resistive gas sensor, a measurement circuitry that is interfacing with the resistive gas sensor may be used. FIG. 1 shows a conventional embodiment of the measurement circuitry MC' that is coupled to a resistive gas sensor GS. The resistive gas sensor comprises a resistor Rsensor having a variable resistance that is changeable under the influence of a gaseous component of a gas in the environment of the sensor. The measurement circuitry MC' comprises a respective logarithmic converter Q1, Q2 arranged in two current paths P1 and P2 to perform a logarithmic compression of a signal current IR and a reference current $I_{REF}$. The signal current $I_R$ is a current that is derived from a sensor current flowing through the gas sensor that is mirrored into the first current path P1 and in the logarithmic converter Q1. The reference current $I_{REF}$ is a current that is derived from a current $I'_{REF}$ generated by a constant current source CS and mirrored by another current mirror in the second current path P2 and in the logarithmic converter Q2.

The output signals $V_{EB1}$ and $V_{EB2}$ of the respective logarithmic converter Q1 and Q2 are evaluated by an evaluation circuit not shown in FIG. 1. The evaluation circuit may determine a difference signal $V_{in}$ representing a difference of the output signals $V_{eb1}$ and $V_{eb2}$ of the logarithmic converter. The difference signal $V_{in}$ is an analog signal that may be changed to a digital signal $Code_{Vin}$ by an n-bit ADC of the evaluation circuit not shown in FIG. 1. The digital signal $Code_{Vin}$ may be processed by the evaluation circuit to determine the resistance of the resistive gas sensor GS by $$Rs = Rref * \text{antilog}\left(\frac{2^n * \left(\frac{kT}{q}\right)}{Code_{Vin} * Vadc}\right) \quad (1)$$

wherein Rref is the resistance of an on-chip reference resistor, T is the junction temperature, k is the Boltzmann Constant ($1.3806488*10^{-16}$ joule/Coulomb), q is the electronic charge ($1.602*10^{-19}$ Coulomb), Vadc is the voltage reference of the ADC, n is the resolution of the ADC and $Code_{Vin}$ is the ADC output code. The calculation shows that the calculation of the sensor resistance Rs has dependencies on various parameters including the accurate thermal voltage $$\frac{kT}{q}$$

for any given junction temperature, an ADC reference voltage value error due to process variation, a drift of the ADC reference voltage Vadc with temperature, a drift of the ADC reference voltage with lifetime, etc. Thus, the calculation of the sensor resistance Rs as performed by the evaluation circuit will have multiple sources of error.

Figure 2:
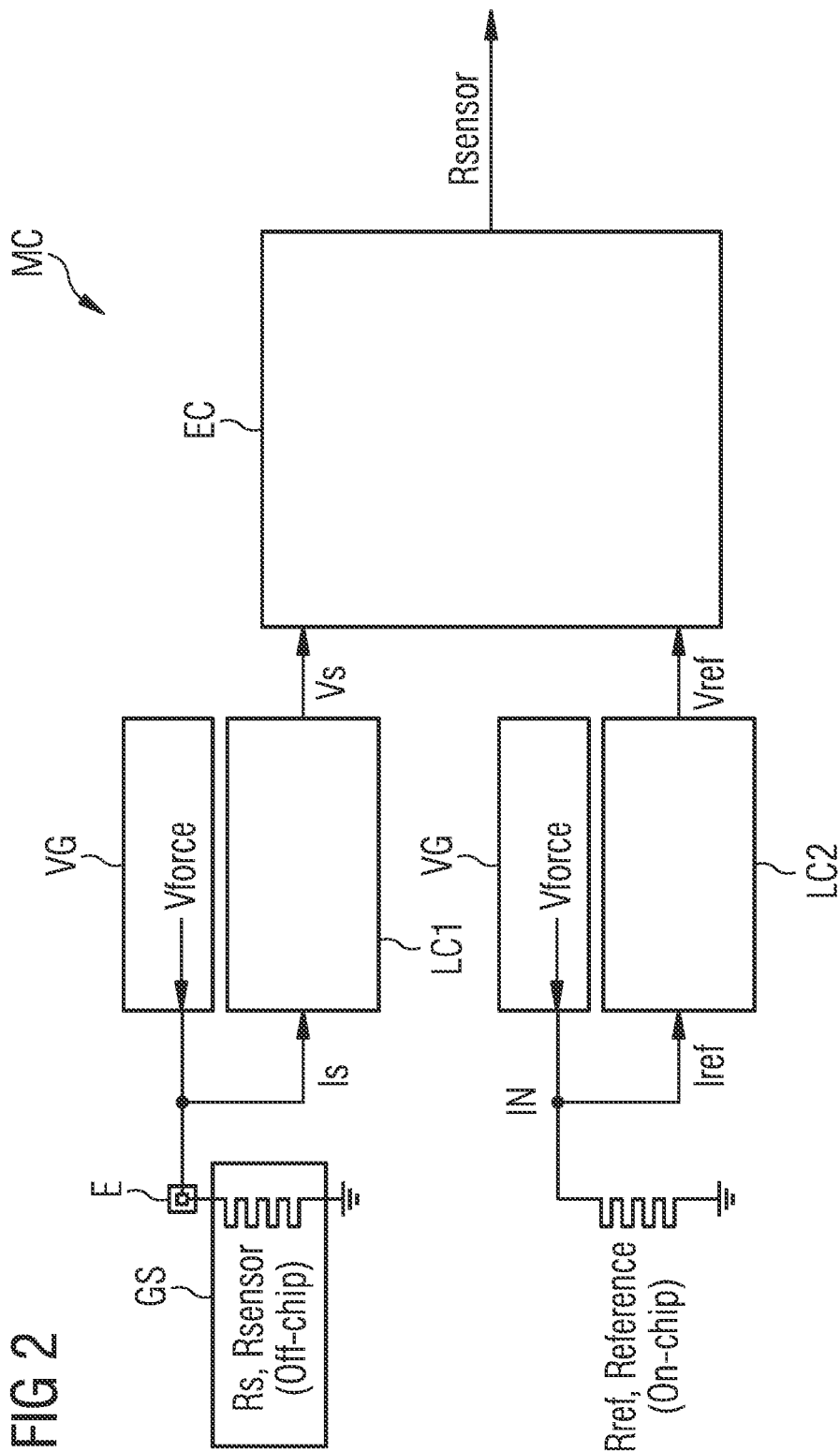
FIG. 2 shows a conceptual sensor measurement block diagram.

FIG. 2 shows a conceptual sensor measurement block diagram of a measurement circuitry MC for evaluating a resistance Rs of a changeable resistor Rsensor of a resistive gas sensor GS. The gas sensor GS is coupled to an input terminal/pad E of the measurement circuitry MC. The measurement circuitry comprises a reference resistor Rreference that is arranged on-chip, i.e. on/in the substrate of the chip of the measurement circuitry. The reference resistor Rreference is coupled to an input node IN of the measurement circuitry.

The measurement circuitry MC further comprises a voltage generator VG to apply/force a voltage Vforce to the input terminal/pad E and the internal node IN. The measurement circuitry MC further comprises a first logarithmic converter/compression circuit LC1 and a second logarithmic converter/compression circuit LC2. The first logarithmic converter/compression circuit LC1 receives a sensor signal/current Is from the resistive gas sensor at an input of the logarithmic converter/compression circuit LC1. After having performed a logarithmic conversion/compression of the sensor signal/current, the logarithmic converter/compression circuit LC1 generates an output signal Vs that is input to an evaluation circuit EC.

The second logarithmic converter/compression circuit LC2 receives a reference signal/current Iref that is dependent on the resistance Rref of the reference resistor Rreference at the input of the logarithmic converter/compression circuit LC2. After having performed a logarithmic conversion/compression of the reference signal/current Iref the logarithmic converter/compression circuit LC2 generates an output signal Vref that is input to the evaluation circuit EC.

The evaluation circuit EC is configured to calculate the resistance Rs of the resistor Rsensor of the gas sensor GS based on $$Vs - Vref = -\frac{kT}{q} * \ln\left(\frac{Rs}{Rref}\right) \quad (2)$$

The diagram of FIG. 2 shows the generic concept of an embodiment of the measurement circuitry MC for measuring the resistance Rs of the resistor Rsensor of the resistive gas sensor GS. As shown in FIG. 2, the measurement circuitry MC generates a simultaneous excitation voltage Vforce for the resistor Rsensor of the resistive gas sensor GS and the internal reference resistor Rref of the measurement circuitry MC. A respective logarithmic converter/compression circuit LC1, LC2 for the sensor current Is and the reference current Iref is provided to produce the sensor voltage Vs and the reference voltage Vref in the log scale. A differential/difference signal Vin=Vs−Vref has the information of the sensor resistance Rs with reference to the resistance Rref of the reference resistor Rreference.

Figure 3A:
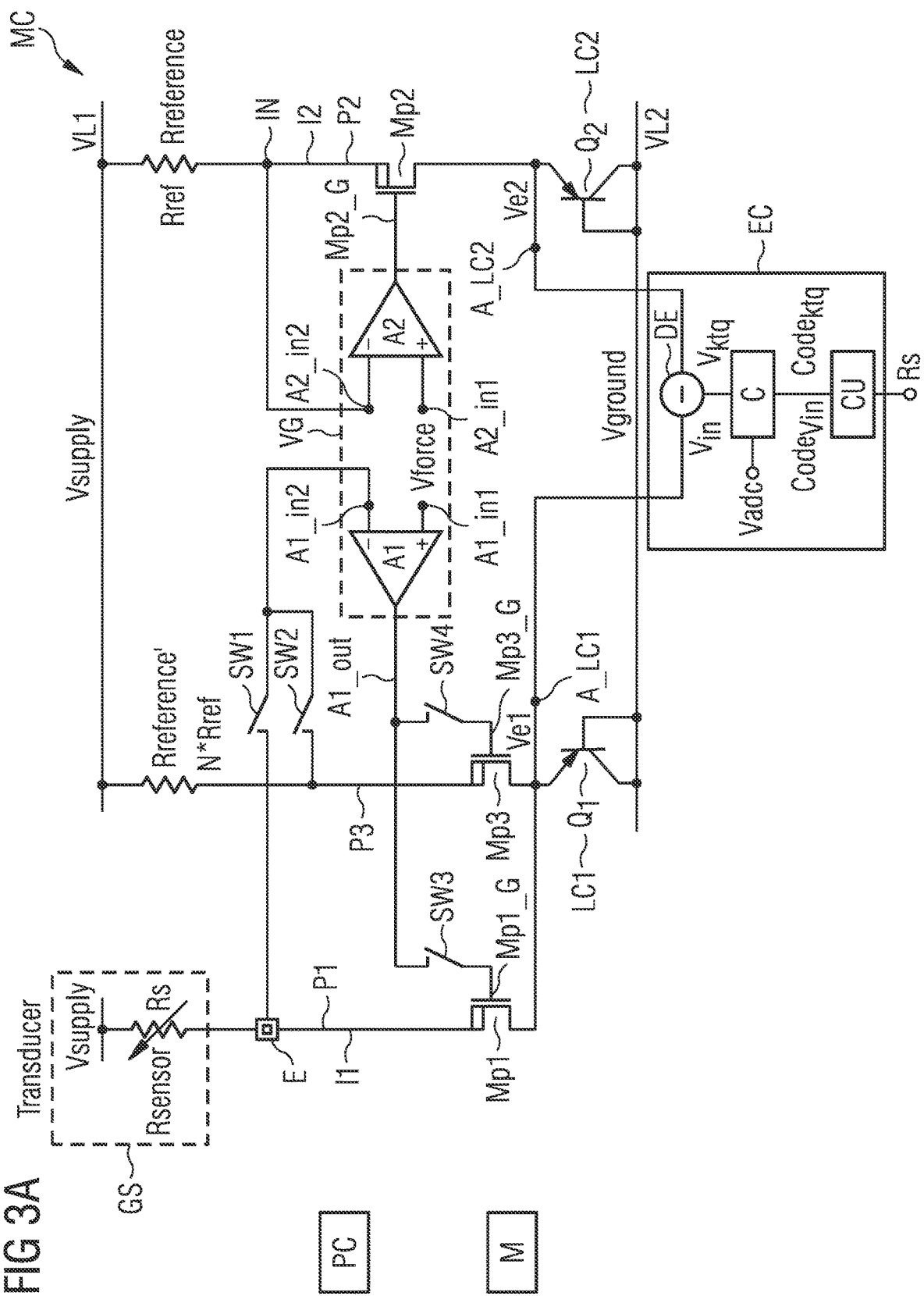
FIG. 3A shows a first embodiment of a measurement circuitry for evaluating a resistance of a resistive gas sensor.
Figure 3B:
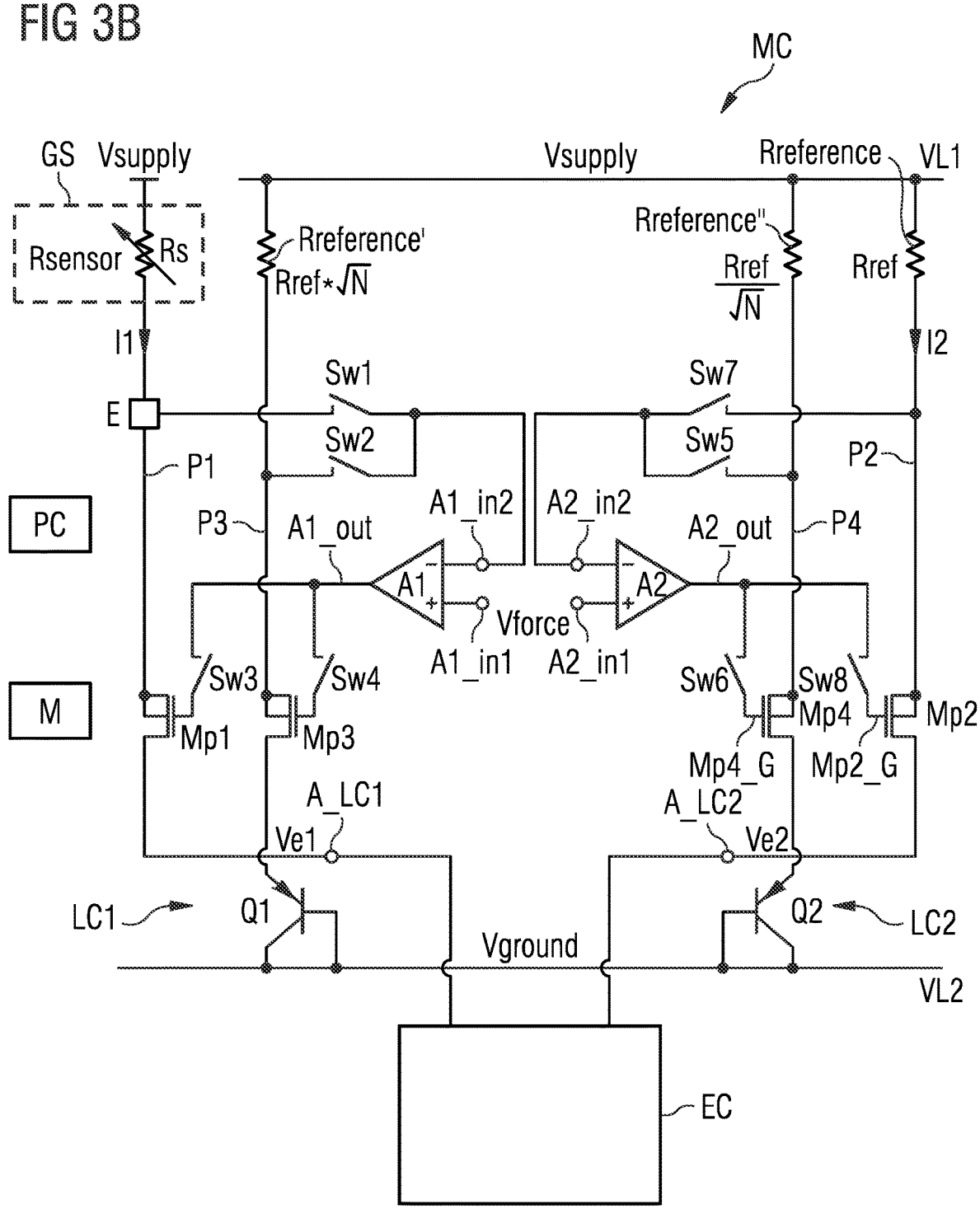
FIG. 3B shows a second embodiment of a measurement circuitry for evaluating a resistance of a resistive gas sensor.
Figure 3C:
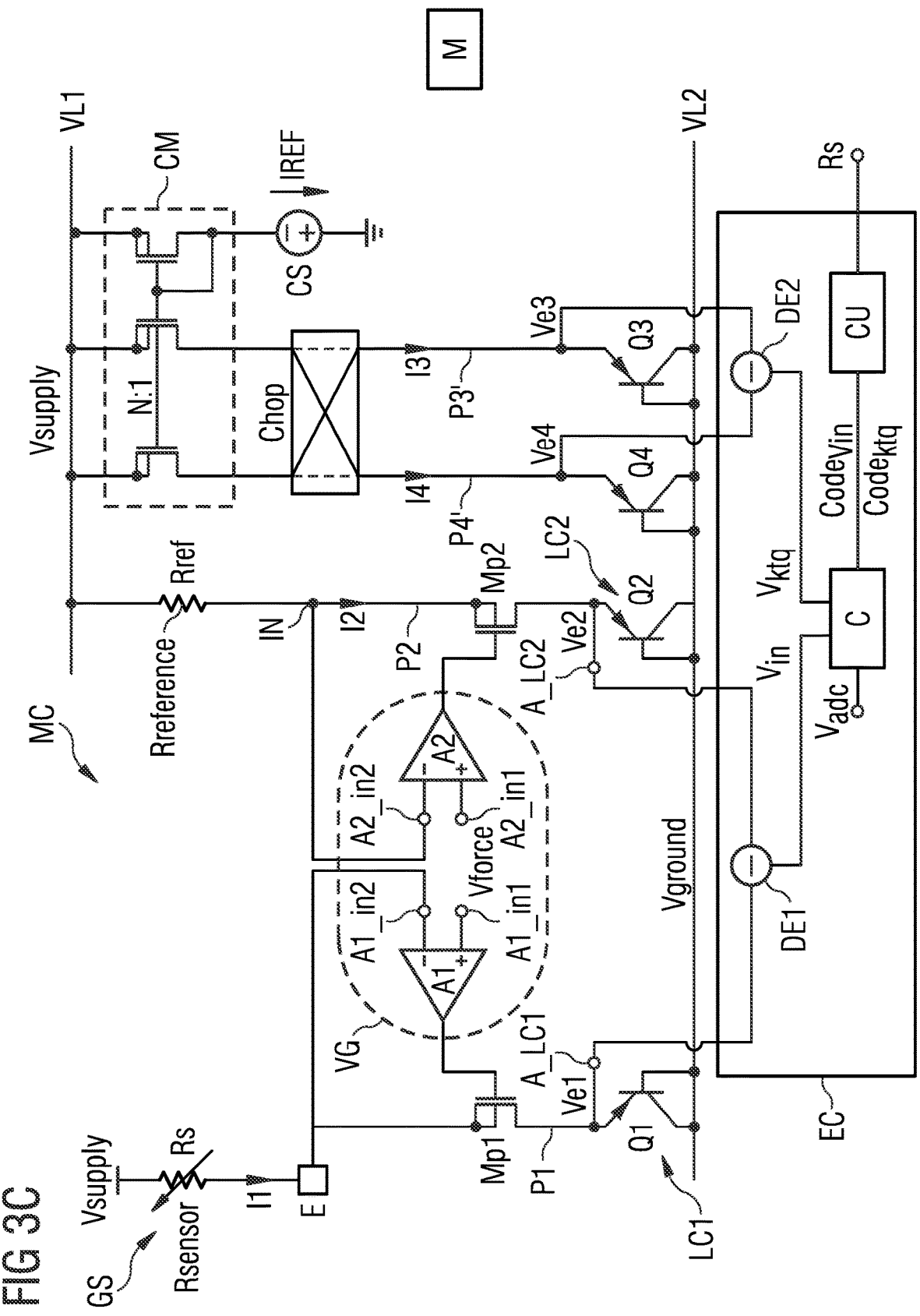
FIG. 3C shows a third embodiment of a measurement circuitry for evaluating a resistance of a resistive gas sensor.

FIGS. 3A, 3B and 3C show possible implementations for the measurement circuitry MC according to the generic concept illustrated in FIG. 2. Each of the measurement circuitries MC for evaluating the resistance Rs of a resistive gas sensor comprises an input terminal/pad E for connecting the measurement circuitry to the resistive gas sensor GS. The input terminal E is configured to apply an input signal I1, for example a sensor current, received from the resistive gas sensor GS. The resistive gas sensor GS comprises a resistor Rsensor of which the resistance Rs is dependent on the components of the gas in the atmosphere to which the gas sensor is exposed. The measurement circuitry MC further comprises a reference resistor Rreference having a resistance Rref.

As shown in FIGS. 3A, 3B and 3C, the measurement circuitry MC further comprises a voltage generator VG to provide a fixed voltage excitation for the resistive gas sensor GS and the reference resistor Rreference. The input terminal E of the measurement circuitry is arranged at the input of a first current path P1. The measurement circuitry MC further comprises a second current path P2 in which the reference resistor Rreference is arranged.

Each of the embodiments of the measurement circuitry shown in FIGS. 3A, 3B and 3C comprise logarithmic converter/compression circuits. A first logarithmic converter/compression circuit LC1 is arranged in the first current path P1 such that a first current I1, i.e. the sensor current of the resistive gas sensor GS, flows from the gas sensor GS to the input terminal E and from the input terminal E into the first logarithmic converter/compression circuit LC1. That means that it is the sensor current itself that flows in the first logarithmic converter/compression circuit.

A second logarithmic converter/compression circuit LC2 is arranged in the second current path P2 such that a second current I2 flowing through the reference resistor Rreference flows into the second logarithmic converter/compression circuit LC2. The first logarithmic converter/compression circuit LC1 is configured to generate a first output signal Ve1 in dependence on the first current I1. The second logarithmic converter/compression circuit LC2 is configured to generate a second output signal Ve2 in dependence on the second current I2.

According to the embodiments of the measurement circuitry MC shown in FIGS. 3A and 3B, the measurement circuitry further comprises an evaluation circuit EC to determine the resistance Rs of the resistive gas sensor GS. The evaluation circuit EC is configured to determine the resistance Rs of the resistive gas sensor GS in dependence on the first output signal Ve1 and the second output signal Ve2. In particular, the evaluation circuit EC may be configured to determine the resistance Rs of the resistive gas sensor GS in dependence on a ratio of a thermal voltage $V_{ktq}$ of the measurement circuitry and a difference signal $V_{in}$ having a level representing the difference between the level of the first output signal Ve1 and the level of the second output signal Ve2.

According to the embodiments of the measurement circuitry MC shown in FIGS. 3A, 3B and 3C, the measurement circuitries comprise a first fixed voltage line VL1 to provide one of a supply potential Vsupply and a ground potential Vground. The measurement circuitries further comprise an internal node IN that is arranged in the second current path P2. The reference resistor Rreference is arranged between the first fixed voltage line VL1 and the internal node IN.

The measurement circuitry MC comprises a first operational amplifier A1 having a first input A1_in1 to apply an excitation voltage Vforce and a second input A1_in2. The measurement circuitry MC further comprises a second operational amplifier A2 having a first input A2_in1 to apply the excitation voltage Vforce and a second input A2_in2. The second input A1_in2 of the first operational amplifier A1 is connected to the input terminal/pad E of the measurement circuitry. The second input A2_in2 of the second operational amplifier A2 is connected to the internal node IN.

The measurement circuitry MC further comprises a first driver Mp1 and a second driver Mp2. The first driver Mp1 is arranged in the first current path P1 between the input terminal/pad E of the measurement circuitry and the first logarithmic converter/compression circuit LC1. The second driver Mp2 is arranged in the second current path P2 between the internal node IN of the measurement circuitry and the second logarithmic converter/compression circuit LC2. The first driver Mp1 is controlled by the first operational amplifier A1 and the second driver Mp2 is controlled by the second operational amplifier A2. The first driver Mp1 may be configured as a transistor having a gate/control terminal Mp1_G that is connected to an output A1_out of the first operational amplifier A1. The second driver Mp2 may be configured as a transistor having a control/gate terminal Mp2_G being connected to an output A2_out of the second operational amplifier A2.

The measurement circuitry MC comprises a second fixed voltage line VL2 to provide one of the supply potential Vsupply and the ground potential Vground. The second fixed voltage line VL2 is configured to provide the ground potential Vground when the first fixed voltage line VL1 provides the supply potential Vsupply. The second fixed voltage line VL2 is configured to provide the supply potential Vsupply when the first fixed voltage line VL1 provides the ground potential Vground. The voltage that is forced by the voltage generator VG on the node E is either done so with reference to VL1, for example with reference to Vsupply, or with reference to VL2, for example with reference to Vground.

The second current path P2 is arranged between the first and the second fixed voltage line VL1, VL2. The first logarithmic converter/compression circuit LC1 is arranged between the input terminal/pad E of the measurement circuitry and the second fixed voltage line VL2. The second logarithmic converter/compression circuit LC2 is arranged between the internal node IN of the measurement circuitry and the second fixed voltage line VL2.

In the following, the particular embodiment of the measurement circuitry MC as shown in FIG. 3A is described.

The measurement circuitry MC comprises a third current path P3 being arranged between the first fixed voltage line VL1 and the second fixed voltage line VL2. The measurement circuitry MC further comprises another reference resistor Rreference' being arranged in the third current path P3. According to the embodiment of the measurement circuitry MC shown in FIG. 3A, the resistance of the reference resistor Rreference is Rref and the resistance of the other reference resistor Rreference' is N*Rref. The first logarithmic converter/compression circuit LC1 is arranged in a common branch of the first current path P1 and the third current path P3.

The measurement circuitry MC comprises a third driver Mp3 being arranged in the third current path P3 between the other reference resistor Rreference' and the first logarithmic converter/compression circuit LC1. The third driver Mp3 is controlled by the first operational amplifier A1.

According to the embodiment of the measurement circuitry MC shown in FIG. 3A, the measurement circuitry MC comprises a first controllable switch Sw1 being arranged between the input terminal/pad E of the measurement circuitry and the second input A1_in2 of the first operational amplifier A1. The measurement circuitry further comprises a second controllable switch Sw2 being arranged between the second input A1_in2 of the first operation amplifier A1 and the third current path P3. The measurement circuitry comprises a third controllable switch Sw3 being arranged between the output A1_out of the first operation amplifier A1 and the control terminal Mp1_G of the first driver Mp1. The measurement circuitry further comprises a fourth controllable switch Sw4 being arranged between the output A1_out of the first operational amplifier A1 and the control terminal Mp3_G of the third driver Mp3. The measurement circuitry MC comprise a control circuit PC to control the first, second, third and fourth controllable switches Sw1, Sw2, Sw3 and Sw4 for measuring/determining the resistance Rs of the resistor Rsensor of the resistive gas sensor GS.

The control circuit PC is configured to operate the first and the third controllable switch Sw1 and Sw3 in a respective conductive state and to operate the second and the fourth controllable switch Sw2 and Sw4 in a non-conductive state to perform a first measurement of the respective level of the first and the second output signal Ve1 and Ve2. The control circuit PC is further configured to operate the second and the fourth controllable switch Sw2 and Sw4 in a respective conductive state and to operate the first and the third controllable switch Sw1 and Sw3 in a non-conductive state to perform a second measurement of the respective level of the first and second output signal Ve1 and Ve2. The first output signal Ve1 is provided at an output terminal A_LC1 of the first logarithmic converter/compression circuit LC1. The second output signal Ve2 is generated at an output terminal A_LC2 of the second logarithmic converter/compression circuit LC2. Each of the output signals Ve1 and Ve2 may be a voltage signal.

The evaluation circuit EC may comprise a differentiating element DE to calculate a difference signal Vin, Vktq between the first output signal Ve1 and the second output signal Ve2. Furthermore, the evaluation circuit comprises a calculation unit to calculate the resistance Rs of the resistor Rsensor. The measurement circuitry MC comprises an analog to digital converter C connected between the differentiating element DE and the calculation unit CU to convert an analog input signal to a digital output signal. The evaluation circuit EC is configured to calculate a first (analog) difference signal $V_{in}$ having a level in dependence on a difference between the respective level of the first output signal Ve1 and the second output signal Ve2 measured during the first measurement. Furthermore, the evaluation circuit EC is configured to calculate a second (analog) difference signal $V_{ktq}$ having a level in dependence on a difference between the respective level of the first and second output signal Ve1 and Ve2 measured during the second measurement. The second difference signal $V_{ktq}$ is the thermal-voltage value of the measurement circuitry MC.

The digital converter C is configured to transform the first analog difference signal Vin to the digital difference signal $Code_{Vin}$ and to transform the second analog difference signal $V_{ktq}$ to the digital difference signal $Code_{ktq}$. By using the analog to digital converter C with the reference voltage Vadc the first analog difference signal $V_{in}$ is $$V_{in} = Ve1 - Ve2 = \frac{Code_{Vin} * Vadc}{2^n}, \qquad (3)$$

wherein Ve1 and Ve2 are the output signals during the first measurement. The second analog difference signal $V_{ktq}$ is $$V_{ktq} = Ve1 - Ve2 = \frac{Code_{ktq} * Vadc}{\ln(n) * 2^n}, \qquad (4)$$

wherein Ve1 and Ve2 are the output signals during the second measurement.

The calculation unit CU calculates the sensor resistance Rs by $$Rs = Rref * \text{antilog}\left\{\frac{V_{ktq}}{V_{in}}\right\} \quad (5)$$

As shown by equation 5, the calculation unit CU is configured to determine the resistance of the resistor Rsensor of the resistive gas sensor GS in dependence on the resistance Ref of the reference resistor Rreference and in dependence on the first difference signal $V_{in}$ and the second difference signal $V_{ktq}$.

FIG. 3B shows an embodiment of the measurement circuitry MC that is embodied similar to the configuration of the measurement circuitry shown in FIG. 3A. In addition to the embodiment of the measurement circuitry shown in FIG. 3A, the measurement circuitry MC of FIG. 3B comprises an additional fourth current path being arranged between the first fixed voltage line VL1 and the second fixed voltage line VL2. The measurement circuitry comprises a reference resistor Rreference" being arranged in the fourth current path P4. The second logarithmic converter/compression circuit LC2 is arranged in a common branch of the second current path P2 and the fourth current path P4. The measurement circuitry comprises a fourth driver MP4 being arranged in the fourth current path P4 between the reference resistor Rreference" and the second logarithmic converter/compression circuit LC2. The fourth driver MP4 is controlled by the second operational amplifier A2.

According to the embodiment of the measurement circuitry MC shown in FIG. 3B, the measurement circuitry MC comprises a fifth controllable switch SW5 being arranged between the second input terminal A2_in2 of the second operational amplifier A2 and the fourth current path P4, particularly between the reference resistor Rreference" and the fourth driver MP4. The measurement circuitry further comprises a sixth controllable switch SW6 being arranged between the output A2_out of the second operational amplifier A2 and the control terminal MP4_G of the fourth driver MP4. The measurement circuitry comprises a seventh controllable switch SW7 being arranged between the second input A2_in2 and the second current path P2, particularly a position of the second current path between the reference resistor Rreference and the second driver MP2. The measurement circuitry further comprises an eighth controllable switch SW8 being arranged between the output A2_out of the second operational amplifier A2 and the control terminal MP2_G of the second driver MP2.

The measurement circuitry MC comprises the control circuit PC to control the controllable switches for measuring/determining the resistance Rs of the resistor Rsensor of the sensitive gas sensor GS.

The control circuit PC is configured to operate the first and the third controllable switches SW1 and SW3 as well as the seventh and the eighth controllable switches SW7 and SW8 in a respective conductive state and to operate the other controllable switches in a non-conductive state to perform a first measurement of the respective level of the first and second output signal Ve1 and Ve2. The control circuit PC is further configured to operate the second and the fourth controllable switches SW2 and SW4 as well as the fifth and sixth controllable switches SW5 and SW6 in a respective conductive state and to operate the other controllable switches in a non-conductive state to perform a second measurement of the respective level of the first and the second output signal Ve1 and Ve2. The first output signal Ve1 is provided at the output terminal A_LC1 of the first logarithmic converter/compression circuit LC1, and the second output signal Ve2 is generated at an output terminal A_LC2 of the second logarithmic converter/compression circuit LC2.

The evaluation circuit EC receives the output signals Ve1 and Ve2 and is configured as explained above for the evaluation circuit EC of FIG. 3A. The evaluation circuit EC calculates the sensor resistance Rs by equation (5).

In the following the particular embodiment of the measurement circuitry MC for measuring/evaluating the resistance Rs of the resistor Rsensor of the resistive gas sensor as illustrated in FIG. 3C is described.

The measurement circuitry MC shown in FIG. 3C comprises a third current path P3' and a fourth current path P4' being connected between the first and the second fixed voltage lines VL1 and VL2. The measurement circuitry MC comprises a current mirror CM to provide a third current I3 in the third current path P3' and a fourth current I4 in the fourth current path P4'. The current mirror CM is configured such that the fourth current I4 is N times larger than the third current I3. The measurement circuitry MC further comprises a third logarithmic converter/compression circuit LC3 to provide a third output signal Ve3. The third logarithmic converter/compression circuit LC3 is arranged in the third current path P3'. The measurement circuitry MC further comprises a fourth logarithmic converter/compression circuit LC4 to provide a fourth output signal Ve4. The fourth logarithmic converter/compression circuit LC4 is arranged in the fourth current path P4'. A chopping element Chop may be arranged between the third current path P3' and the fourth current path P4'. A reference current source CS generates a reference current Iref that is mirrored by the current mirror CM to provide the third current I3 in the third current path P3' and the fourth current I4 in the fourth current path P4'.

The evaluation circuit EC comprises a first differentiating element DE1. The evaluation circuit EC is configured by means of the first differentiating element DE1 to calculate a first analog difference signal $V_{in}$ having a level in dependence on a difference between the respective level of the first output signal Ve1 and the second output signal Ve2. The evaluation circuit EC further comprises an analog to digital converter C with a reference voltage Vadc that receives the first analog difference signal $V_{in}$ and generates a digital output signal $\text{Code}_{Vin}$. The relationship between the first analog difference signal $V_{in}$ and the digital output signal $\text{Code}_{Vin}$ is $$V_{in} = Ve1 = Ve2 = \frac{\text{Code}_{Vin} * Vadc}{2^n} \quad (3')$$

The evaluating circuit EC further comprises a second differentiating element DE2 by which the evaluation circuit EC calculates a second analog difference signal $V_{ktq}$ having a level in dependence on a difference between the respective level of the third output signal Ve3 and the fourth output signal Ve4. The second analog difference signal $V_{ktq}$ is input to the analog to digital converter C. The analog to digital converter C transforms the second analog difference signal $V_{ktq}$ to the digital output signal $\text{Code}_{ktq}$. The relationship between the second analog difference signal $V_{ktq}$ and the digital output signal $\text{Code}_{ktq}$ is $$V_{ktq} = Ve4 - Ve3 = \frac{Code_{ktq} * Vadc}{\ln(N) * 2^n} \quad (4')$$

The evaluation circuit EC according to FIG. 3C is configured to determine the resistance Rs of the resistive gas sensor GS in dependence on the relationship between the first difference signal $V_{in}$ and the second difference signal $V_{ktq}$ by $$Rs = Rref * \text{antilog}\left\{\frac{V_{ktq}}{V_{in}}\right\} \quad (5')$$

The calculation unit CU is configured to determine the resistance Rs of the resistor Rsensor of the resistive gas sensor GS in dependence on the resistance Rref of the reference resistor Rreference and in dependence on the first difference signal $V_{in}$ and the second difference signal $V_{ktq}$.

According to the embodiments of the measurement circuitry shown in FIGS. 3A, 3B and 3C, the calculation unit CU of the evaluation circuit EC receives the digital signal $Code_{Vin}$ and the digital signal $Code_{ktq}$. The calculation unit CU is configured to calculate the resistance Rs by $$Rs = Rref * \text{antilog}\left\{\frac{Code_{ktq}}{Code_{Vin} * \ln(N)}\right\} \quad (6)$$

wherein N specifies the ratio between the resistance of the reference resistor Rreference and the resistance of the other reference resistor Rreference' (FIG. 3A) or Rreference'/Reference" (FIG. 3B) or the ratio between the third current I3 and the fourth current I4 (FIG. 3C). The equation (6) results from substituting from equations (3), (4) in the equation (5) or from substituting from equations (3'), (4') in the equation (5').

In order to determine the resistance Rref of the reference resistor Rreference a two-temperature calibration technique may be used. A first measurement is performed to calculate the exact value Rref0 of the reference resistor Rreference so as to eliminate the process variation. A second measurement is performed at a second temperature to measure the temperature coefficient a of the reference resistor Rreference. In this way it is possible to eliminate the source of error in the resistance Rref of the reference resistor Rreference due to process variation and temperature variation by always calculating the resistance Rref for each measurement. The resistance Rref is $$Rref = Rref0 * \{1 - \alpha(Tjn - T0)\} \quad (7),$$

wherein Rref0 specifies the resistance Rref of the reference resistor Rreference measured by the first calibration temperature T0, T0 specifies the first calibration temperature, a specifies the thermal coefficient of the reference resistor Rreference and Tjn specifies the junction temperature when the sensor measurement is done.

As shown in the embodiments of the measurement circuitry of FIGS. 3A, 3B and 3C, each of the logarithmic converter/compression circuits may be configured as a diode Q1, Q2, Q3 and Q4. Each diode may be realized using any two junctions or any parasitic diode from any CMOS device can be replaced for the same functionality. According to a possible embodiment the respective diodes Q1, Q2, Q3 and Q4 of the logarithmic converter/compression circuits LC1, LC2, LC3 and LC4 have the same size. For the lowest process mismatch, the sizes of the diodes/bipolars Q1, Q2, Q3 and Q4/Mp1, Mp2 and Mp4 and, if applicable, the transistors in the current mirror CM are chosen to be the same. All the layout techniques like common centroid, dummy diodes/bipolars etc. may be employed for the best performance and lowest mismatch. Asymmetric bipolar sizes can also be used by appropriately scaling the reference resistors (FIGS. 3A, 3B) and currents (FIG. 3B) such that the equations (1) and (6) are satisfied.

According to the embodiments of the measurement circuitry shown in FIGS. 3A, 3B and 3C the transducer/gas sensor as well as the measurement circuitry MC may be exited with reference to the supply voltage Vsupply. According to another embodiment, it is possible to excite the gas sensor and the measurement circuitry with reference to the ground potential Vground.

According to an embodiment of the measurement circuitry, the first and second operational amplifiers A1 and A2 as well as the driver devices Mp1, Mp2 and Mp3 respectively may be configured as a PMOS device, as shown in the implementations of FIGS. 3A, 3B and 3C. The first and second operational amplifier may alternatively be designed such that the driver devices Mp1, Mp2 and Mp3 may be configured as an NMOS device.

The measurement circuitry MC as shown in the implementations of FIGS. 3A, 3B and 3C may be used as a wide-range gas-sensor interface that can excite the transducer/gas sensor GS using the voltage signal Vforce and compress the signal current logarithmically to handle the ultra-wide range operation. As shown in FIGS. 3A, 3B and 3C, the gas sensor GS is excited with reference to the supply potential Vsupply such that the sensor signal/sensor current Is directly flows into the logarithmic converter/compression circuit LC1.

The logarithmic converter/compression circuits may be configured as PNP or NPN devices that directly compress the sensor signal/sensor current into the logarithmic scale, because it is the sensor current itself that flows from the sensor into the logarithmic compression/converter circuit LC1. The proposed technique does not need a wide dynamic range current mirror, as shown for example with reference to the embodiment of the measurement circuitry of FIG. 1, that can be a major source of error. The proposed implementations of the measurement circuitry according to FIGS. 3A, 3B and 3C are the most suitable approach for a low supply voltage design (around 1.8 V and lower) where the gas sensor and the measurement circuitry can be fitted without any headroom limitation.

According to the concept of the measurement circuitry MC the changeable resistor Rsensor of the gas sensor and the on-chip reference resistor Rreference are simultaneously excited to measure the sensor resistance Rs relative to the resistance Rref of the on-chip reference resistor Rreference. Simultaneous excitation of the transducer/gas sensor GS and the on-chip reference resistor Rreference eliminates the mismatch of measurement/excitation circuit and instantaneous errors due to coupling from the supply potential, the ground potential etc.

This approach also makes the design immune to noise since a differential signal is measured instead of measuring a signal referred to a supply or ground potential. The ratiometric measurement to calculate the sensor resistance Rs makes the sensor measurement particularly invariant to the voltage reference Vadc of an analog to digital converter. The constants needed for a re-calculation of the transducer resistance Rs are calculated using the same logarithmic converter/compression circuit and the same analog to digital converter used for measurement of the sensor signal. Ratiometrically, the impact of the voltage reference Vadc of the analog to digital converter C is cancelled. This makes the design robust across the temperature, process and lifetime drift of the voltage reference Vadc.

The generation and calculation of the thermal voltage $V_{ktq}$ using the reference resistor Rreference having the resistance Rref and the other reference resistor Rreference' having a resistance of N*Rref is shown in FIG. 3A. The generation and calculation of the thermal voltage $V_{ktq}$ by means of a current I3 and a current I4 being N times larger than the current I3 is shown according to the implementation of the measurement circuitry shown in FIG. 3B. Measuring the thermal voltage $V_{ktq}$ and the sensor signal using the same blocks/components/diodes for the sensor signal measurement and the internal calculation of the thermal voltage $V_{ktq}$ makes the measurement/calculation independent from the voltage reference Vadc of the analog to digital converter and the thermal-voltage that depends on the junction temperature. The use of a calibrated on-chip resistor reference eliminates the requirement of an external component and makes the sensor measurement more accurate.

Figure 4:
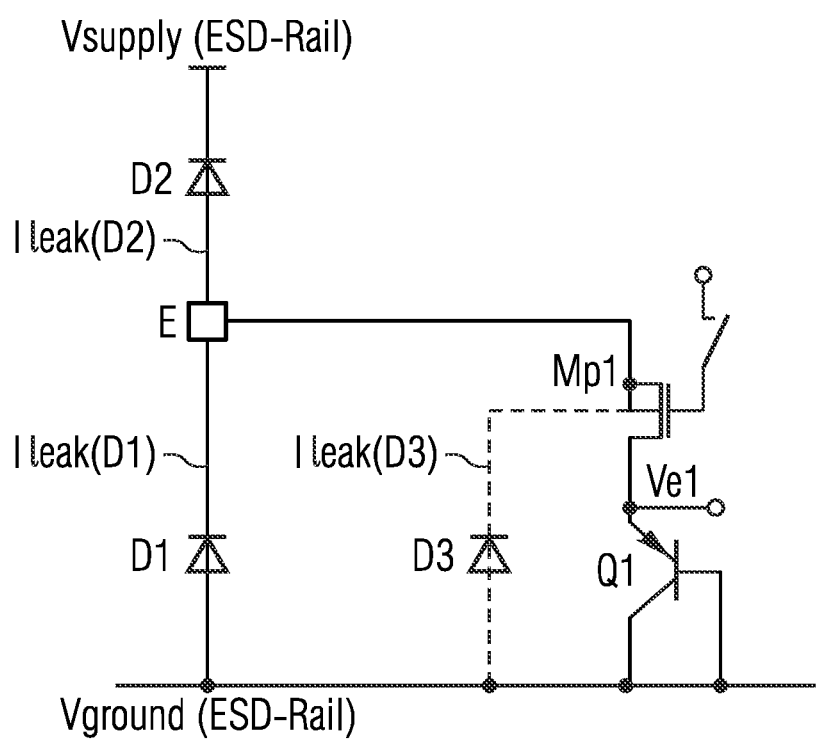
FIG. 4 shows an embodiment of an electrostatic discharge concept for the measurement circuitry for evaluating a resistance of a resistive gas sensor.

FIG. 4 shows a possible ESD concept to protect the measurement circuitry against electrostatic discharge that can occur at the input terminal/pad E of the measurement circuitry. As shown in FIG. 4, diodes D1, D2 and D3 are provided that realize the ESD protection circuit. The diode D3 may be embodied as a parasitic diode. The generation of a fixed sensor excitation voltage Vforce ensures that the leakage due to the ESD protection circuit comprising the diodes D1, D2 and D3 can be minimized or cancelled to make the measurement circuitry more accurate by matching ESD leakage of the didoes D1, D2 and D3 from the input terminal/pad E to the supply potential Vsupply with the diode from the ground potential Vground to the input terminal/pad E. In order to minimize the errors due to the ESD leakage mismatch the diode areas of the diodes D1, D2 and the parasitic diode D3 are matched such that the leakage current Ileak(D2) flowing through the diode D2 is equal to the sum of the leakage currents Ileak(D1) and Ileak(D3) flowing through the diodes D1 and D3 (Ileak(D2)=Ileak (D1)+Ileak (D3)).

The gas sensor GS can be configured as a stand-alone/separate module that is interfacing with the measurement circuitry MC by connection on a PCB. Another possible solution is a system-in-package (SIP) approach where the transducer module/gas sensor GS and the measurement circuitry MC are in the same package and are connected by a bond-wire on laminate routing inside the package. In this case, there is the possibility of disconnection of the transducer/gas sensor GS from the measurement circuitry MC. For many automotive products, the detection of the disconnection of the transducer/gas sensor from the measurement circuitry is required to conform to ASIL requirements.

To detect that the transducer/gas sensor GS is disconnected from the measurement circuitry MC, a diagnostic circuit/detection circuit that will not affect the path that connects the sensor resistor Rsensor to the logarithmic converter/compression circuit is built. Adding any current or a voltage excitation in this branch can be detrimental to the system performance due to junction or subthreshold leakages etc. To detect the disconnection of the resistive gas sensor GS from the measurement circuitry, a detection circuit has to be built that does not influence the main sensor branch.

For each of the implementations of the measurement circuitry MC shown in FIGS. 3A, 3B and 3C, whenever the gas sensor GS gets disconnected from the measurement circuitry, the gate node Mp1_G of the driver Mp1 will always saturate to the supply potential Vsupply or the ground potential Vground. The detection circuit can be implemented by either a voltage comparison circuit or a current comparison circuit that is biased by the gate voltage of the driver Mp1. A detection threshold can be derived from the gate-bias node Mp1_G itself, or the voltage measured at the gate terminal Mp1_G of the driver Mp1 can be compared with an on-chip reference, for example a bandgap reference.

Figure 5A:
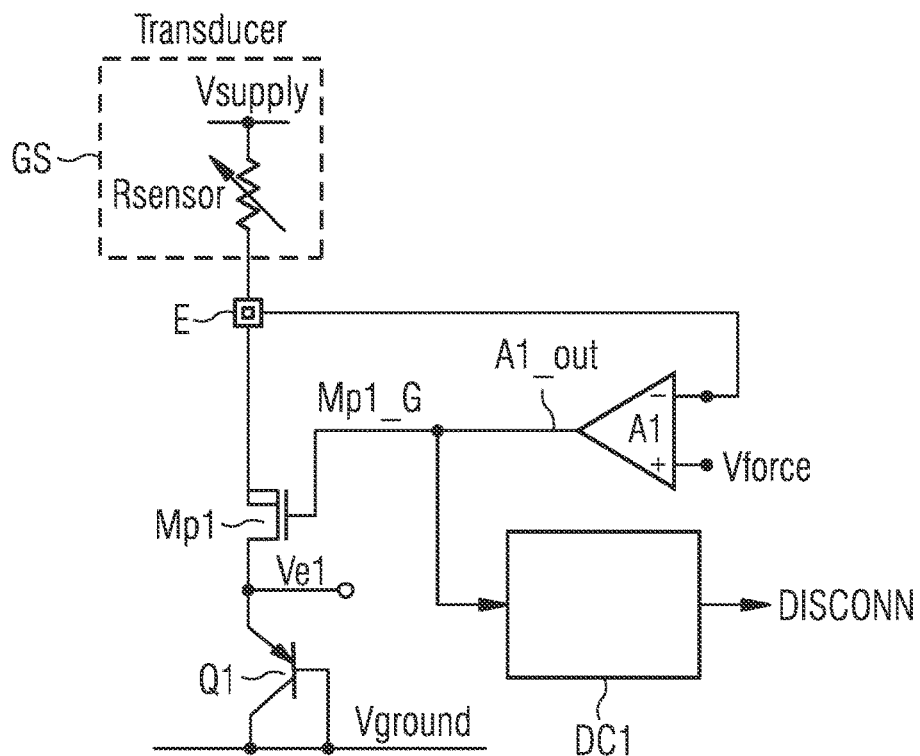
FIG. 5A shows an embodiment of the measurement circuitry for evaluating a resistance of a resistive gas sensor comprising a first implementation of a detection circuit to detect a disconnection of the resistive gas sensor from the measurement circuitry.
Figure 5B:
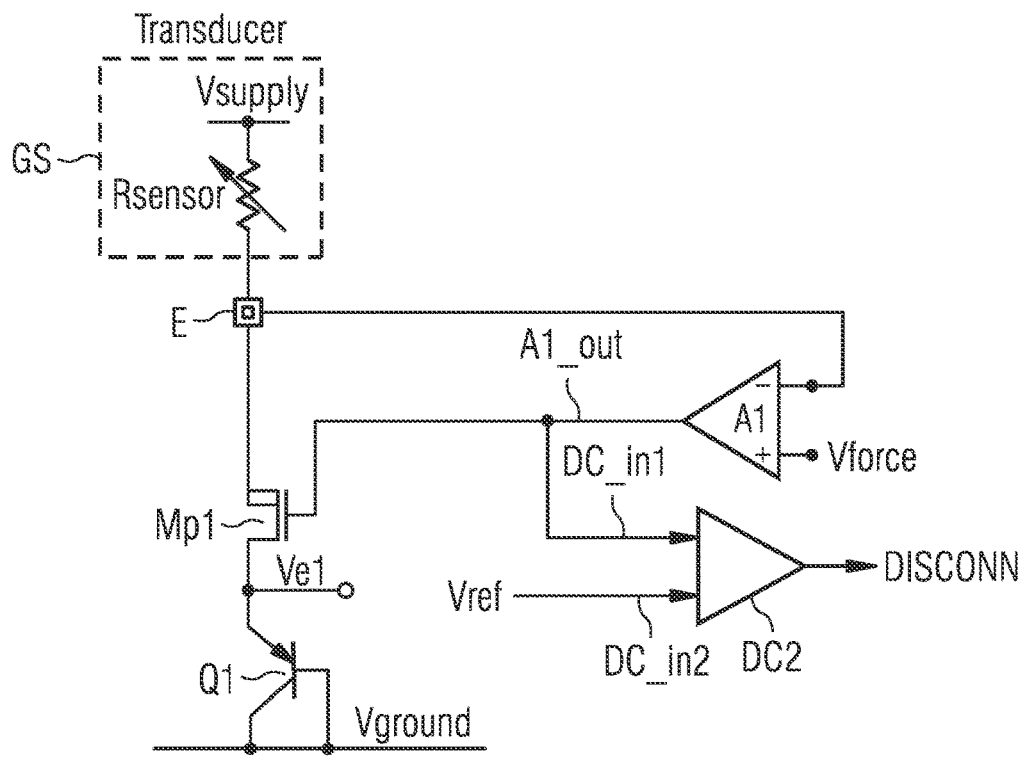
FIG. 5B shows an embodiment of a measurement circuitry for evaluating a resistance of a resistive gas sensor comprising a second implementation of a detection circuit to detect a disconnection of the resistive gas sensor from the measurement circuitry.

FIGS. 5A and 5B show two possible implementations for a detection circuit to detect a disconnection of the resistive gas sensor GS from the input terminal/pad E of the measurement circuitry MC. FIG. 5A shows a current or a voltage comparison strategy where the reference voltage or current is generated based on the gate voltage of the driver device Mp1. The detection circuit DC1 is configured as a voltage/current comparator being connected to the output A1_out for the first operational amplifier A1 and being configured to generate its reference voltage based on the output voltage V_A1 of the first operational amplifier A1. The detection circuit DC1 generates a DISCONN diagnostic flag when the gate Mp1_G of the driver Mp1 saturates to the supply voltage Vsupply or the ground potential Vground indicating that the gas sensor is disconnected from the measurement circuitry. Another implementation would be to mirror the current flowing into the driver device Mp1 and use the mirror current to detect the disconnection of the gas sensor.

According to an alternative embodiment shown in FIG. 5B, the measurement circuitry MC comprises the detection circuit DC2 that is configured as a comparator having a first input connection DC_in1 being connected to the output A1_out of the first operational amplifier A1 and having a second input connection DC_in2 to apply the on-chip reference voltage generated on the chip comprising the measurement circuitry. According to the implementation of the detection circuit shown in FIG. 5B, the gate voltage of the driver device Mp1 is compared with an on-chip reference voltage, for example a bandgap reference voltage.

As illustrated according to the embodiments of the measurement circuitry MC shown in FIGS. 3A, 3B and 3C, the resistive gas sensor GS is excited using the voltage Vforce with respect to one of the supply voltage Vsupply and the ground potential Vground that cause signal currents I1 and I2, which are logarithmically compressed usually by diode I-V characteristics of the diodes Q1 and Q2, to generate a voltage measurement signal Vin with a lesser dynamic range. According to the embodiment of the measurement circuitry shown in FIG. 3C, another pair of diodes/transistors Q3 and Q4 are employed to generate the thermal voltage $V_{ktq}$. The generation and calculation of the thermal voltage with an alternate option like using "Rref" and "N*Rref", instead of using currents "Iref" and "N*Iref" is shown in FIG. 3B.

A wide range of resistive sensor measurement is accomplished by using diodes for logarithmically compressed voltage response measurement. However, their current-voltage (I-V) characteristics are effected by high-level current injection and low-level current injection due to junction imperfections. This results in variability of ideality factor η along the diode's operating current range, and introducing measurement errors that can increase exponentially with resistance range.

Each of the logarithmic-compression diodes can be realized using any semiconductor junction, or any parasitic diode from any CMOS device can be replaced for the same functionality. With reference to the embodiment of the measurement circuitry MC shown in FIG. 3C, the sensor resistance Rs is determined by the following equations (8) to (11) by consideration of the ideality factor eta of the diodes Q1, Q2, Q3 and Q4:

$$V_{ktq} = Ve4 - Ve3 = \eta 2 * VT * \ln(N), \quad (8)$$

$$V_{in} = Ve2 - Ve1 = \eta 1 * VT * \text{Ln}(Rsensor/Rref), \quad (9)$$

$$Rs = Rref * \text{antilog}\left\{\frac{\eta 2 * V_{in} * \ln(N)}{\eta 1 * Vref}\right\} \quad (10)$$

$$Rs = Rref * \text{antilog}\left\{\frac{\eta_{norm} * V_{in} * \ln(N)}{V_{ref}}\right\}, \quad (11)$$

wherein Rref is the resistance of the on-chip reference resistor Rreference, Rs is the resistance of the sensor resistor Rsensor of the resistive gas sensor GS that is to be measured, VT is the thermal voltage that is proportional to silicon junction temperature T in Kelvin, N is the ratio of currents used to generate the on-chip thermal voltage, $\eta 1$ is the ideality factor for the diodes Q1 and Q2, $\eta 2$ is the ideality factor for the diodes Q3 and Q4, and $\eta_{norm}$ is the normalized ideality factor obtained from the ratio of $\eta 2$ and $\eta 1$.

The first difference signal $V_{in}$ and the second difference signal $V_{ktq}$ can be measured by feeding them to any data converter sequentially. The resistance Rs of the resistor Rsensor of the resistive gas sensor GS can be calculated from above equations (8) to (11), by implementing them in any digital logic of the evaluation circuit EC. The normalized ideality factor $\eta_{norm}$ can be saved in any digital format using an on-chip memory M, as shown in FIGS. 3A, 3B and 3C.

The primary design implications for this implementation are that a) The reference bias current I2 and the reference resistor Rreference are chosen such that the bias current I2 is the geometric mean of upper and lower limits of the entire current range of the sensor current I1. This would imply that the reference resistor Rreference is the geometric mean of the resistance range of the resistance Rs of the resistor Rsensor of the resistive gas sensor GS to be measured; and b) The current ratio 1:N for generating the second difference signal $V_{ktq}$ is implemented using the individual currents in the current path P3' as Iref/√N and in the current path P4' as Iref*√N and their geometric mean is Iref as well. Hence, the ideality factors of all the transistors are similar for the mean operating current conditions; and c) The areas of the diodes Q1, Q2, Q3 and Q4 are identical and chosen such that uncalibrated measurement errors at both the extreme conditions of low-level and high-level injections (low and high sensor currents I1 respectively) are numerically equal. That implies that the percentage accuracy degradation is the same irrespective of the polarity.

The ideality factor accounts for the imperfect junctions observed in real diodes and transistors. This factor mainly accounts for carrier recombination as charge carriers across the depletion region. This factor is ideally "1" for a region of operation of p-n junction where the high-level injection and the low-level injection effects do not affect the p-n junction behaviour.

Figure 6:
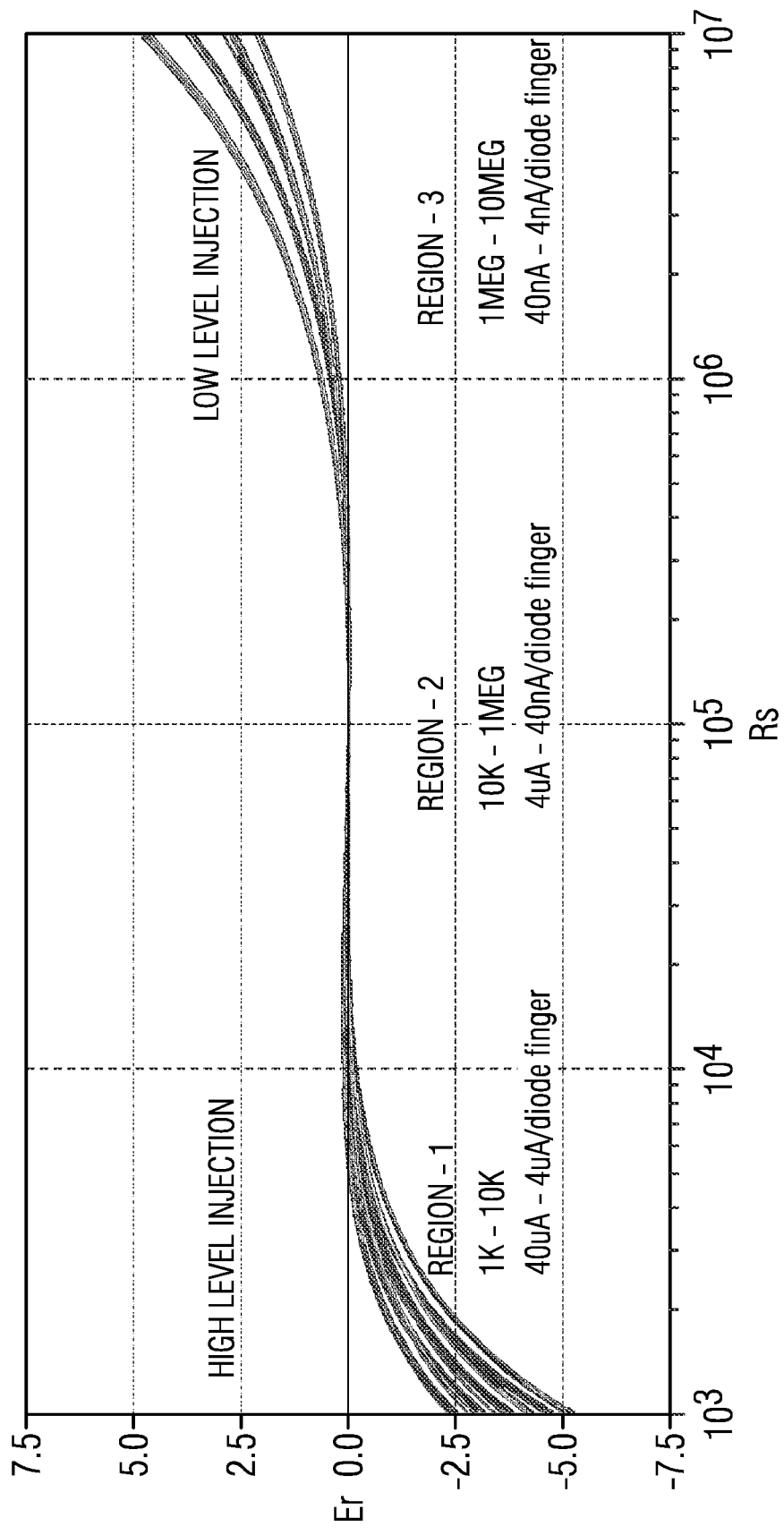
FIG. 6 shows the percentage measurement error for a sensor resistance in a range from 1 KOhms to 10 MOhms using a single normalized ideality factor $\eta_{norm}=1$.

FIG. 6 shows the percentage measurement error Er for the sensor resistance Rs of the variable resistor Rsensor of the resistive gas sensor GS from one kOhms to 10 MOhms using the normalized ideality factor in equation (11) as "1". The percentage error is on the y-axis and the sensor resistance (indirectly the log-compression diode current) is on the x-axis. As illustrated in FIG. 6, the error is small for a diode-current/unit-finger of 40 nA to 4 μA. This corresponds to a MOX sensor resistance Rs of 10 KOhms to 1 MOhms. For a resistance Rs less than 10 KOhms, the error in the final calculated sensor resistance Rs exponentially increases to almost 5%. This is because of high-level injection effect in the p-n junction. Similarly, the low-level injection affects the ideality factor and measurement accuracy when the current through the diode/transistors is smaller than 40 nA.

The sensor excitation conditions (voltage/current) should always be continuous for the entire range of operation. Any discontinuity can cause a physical change and alter the sensor material. It can impact the efficiency of the backend algorithm used for chemical detection as well. Hence, in the following, a calibration technique that will always excite the sensor with the same excitation voltage Vforce for the entire range is presented. The ideality factor $\eta_{norm}$ can be calibrated using a batch calibration technique, a single curvature and offset correction technique and a range-wise curvature and offset correction.

Batch Calibration Technique

According to the batch calibration technique, the ideality factor $\theta_{norm}$ is calculated and calibrated for a defined number of devices, for example thousand diodes, and used as a default value of $\eta_{norm}$ for all fabricated devices. Based on iterative optimization, it has been observed that the most optimal value of the ideality factor is $\eta_{norm}$=0.9935.

Figure 7:
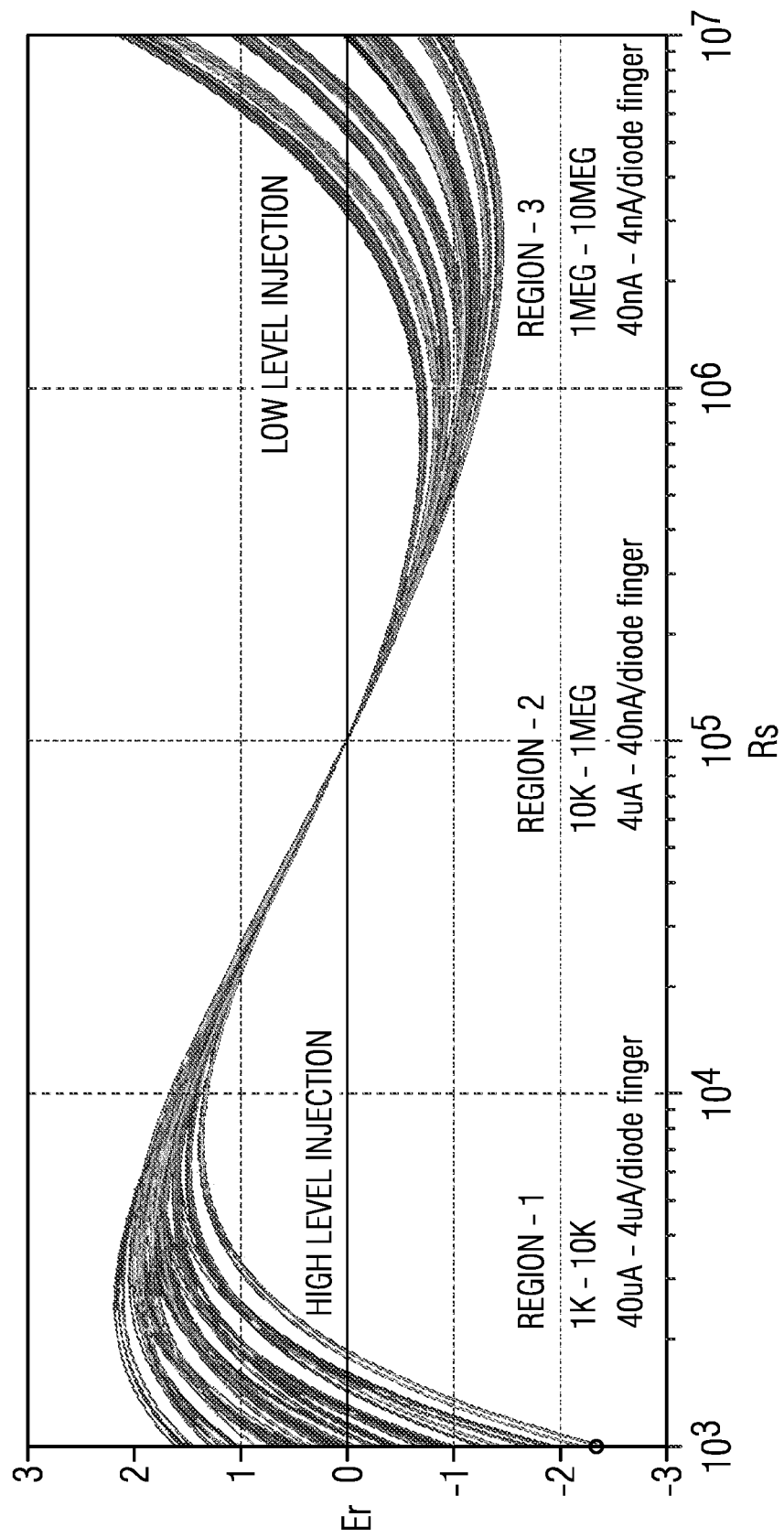
FIG. 7 shows the percentage measurement error for a sensor resistance in a range from 1 Kohms to 10 MOhms using an ideality factor $\eta_{norm}=0.9935$

The diagram in FIG. 7 shows the percentage measurement error Er for the worst case corner simulations. The ideality factor having the value of $\eta_{norm}$=0.9935 is a process parameter that depends on the fabrication process. This is the statistical mean of the measured value based on a characterization during fabrication of the diodes.

The batch calibration method only needs a single calibration coefficient and reduces percentage error from the default value with a normalized ideality factor of "1". The results illustrated in FIG. 7 show that the percentage error is always less than +/−2.5% as compared to when using default value of $\eta_{norm}$=1. The error is 0 at 100 KOhms because the chosen on-chip reference resistance Rref is 100 KOhms. The reference resistor Rreference is chosen at 100 KOhms only because it is the geometric mean of the entire measurement range of 1 KOhms to 10 MOhms.

Single Curvature and Offset Correction Technique

Instead of using batch calibration, it is possible to correct the curvature and offset of the ideality factor $\theta_{norm}$ for each individual sample of the diodes to minimize the percentage measurement error further. This single curvature and offset correction technique is intended to identify a first calibration coefficient/curvature coefficient $\eta_c$ and a second calibration coefficient/offset coefficient $\eta_o$ as indicated in equation (12).

$$Rs = \eta_0 * \left[Rref * \text{antilog}\left\{\frac{V_{in} * \text{Ln}(N)}{V_{ktq}} * \eta_C\right\}\right] \quad (12)$$

wherein $\eta_c$ indicates the curvature correction coefficient for the ideality factor and $\eta_o$ indicates the offset correction coefficient for the ideality factor.

According to equation (12) the resistance Rs of the resistor Rsensor of the resistive gas sensor GS is determined in dependence on the product of the second calibration coefficient $\eta_o$ and the resistance Rref of the reference resistor Rreference and the anti-logarithmic relationship of a term formed by the product of the first calibration coefficient $\eta_c$ and the quotient of the first difference signal $V_{in}$ and the second difference signal $V_{ktq}$.

Figure 8:
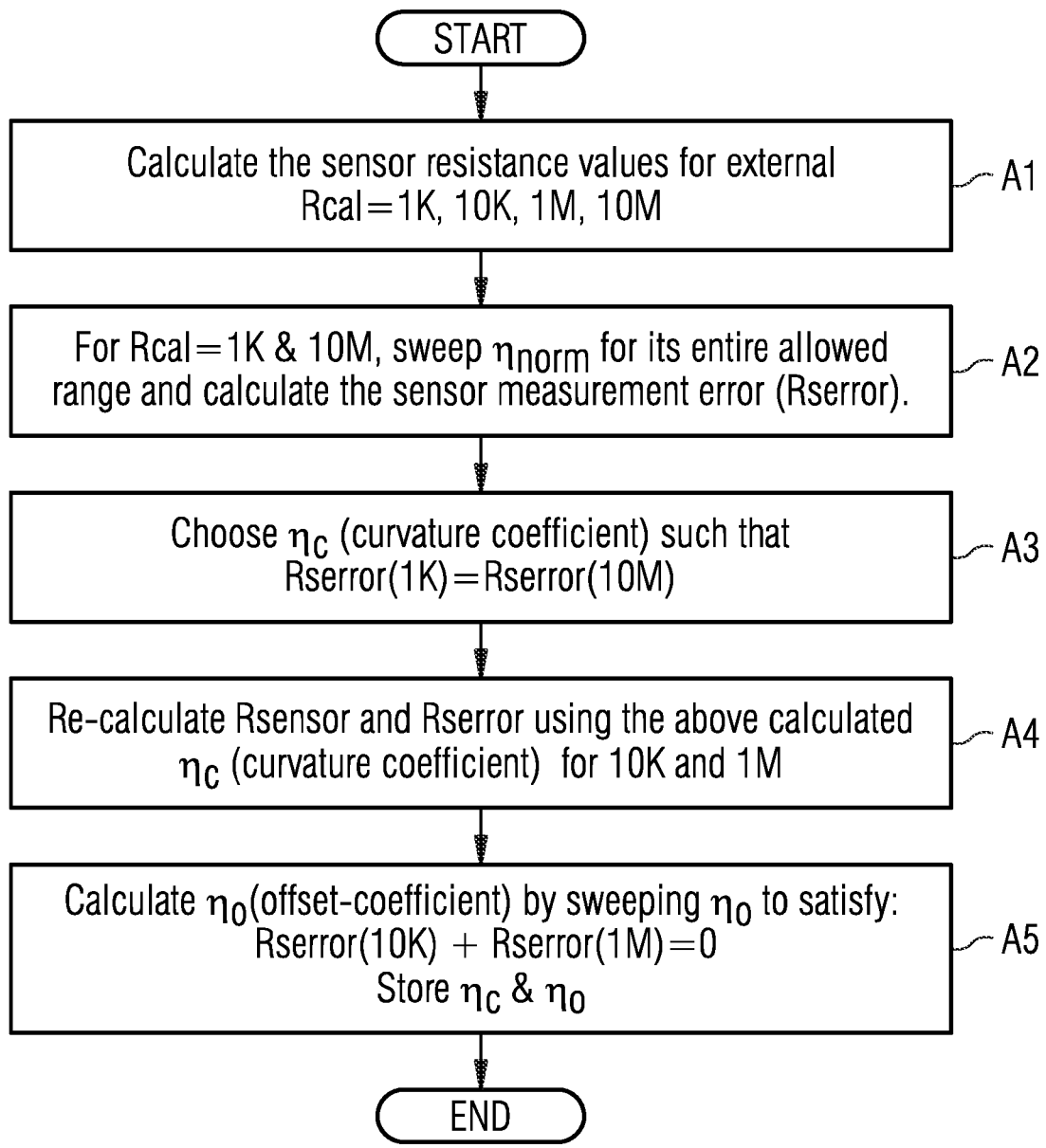
FIG. 8 shows a calibration flow to calculate the coefficients $\eta_c$ and $\eta_o$ for a single curvature and offset calibration technique.

The calibration strategy for computing curvature and offset coefficients for a measurement range of 1 kOhms to 10 MOhms is shown in the flowchart of FIG. 8.

According to step A1 a first calibration resistor having a first calibration resistor having a first resistance Rcal1 and a second calibration resistor having a second calibration resistance Rcal2 is subsequently externally applied to the input terminal E of the measurement circuitry MC for determining the first calibration coefficient $\eta_c$. Regarding the measurement range of 1 KOhms to 10 MOhms, the first calibration resistor may have a first calibration resistance of Rcal1=1 KOhm, the second calibration resistor may have a second calibration resistance of Rcal2=10 MOhms.

In a step A2 a value of the first calibration coefficient $\eta_c$ is varied and a first calculation error between the first calibration resistance Rcal1 and the resistance determined by the evaluation circuit EC is determined, when the first calibration resistor is applied to the input terminal E. Furthermore, the value of the first calibration coefficient $\eta_c$ is varied and a second calculation error between the second calibration resistance Rcal2 and the resistance determined by the evaluation circuit EC is determined, when the second calibration resistor is applied to the input terminal E. For the first calibration resistance Rcal1, for example Rcal1=1 kOhms, and the second calibration resistance, for example Rcal2=10 MOhms, the first calibration coefficient $\eta_c$ is varied for its entire allowed range and the respective sensor measurement error is calculated.

In a step A3, the value of the first calibration coefficient $\eta_c$ is determined such that the first calculation error is equal or almost equal to the second calculation error. Regarding the example given above, the first calibration coefficient/curvature coefficient $\eta_c$ is chosen such that the first calculation error Rserror (1 KOhms) is equal or almost equal to Rserror (10 MOhms).

In order to determine the second calibration coefficient $\eta_o$, in a step A4, a third calibration resistor having a third calibration resistance Rcal3 and a fourth calibration resistor having a fourth calibration resistance Rcal4 is subsequently externally applied to the input terminal E of the measurement circuitry MC for determining the second calibration coefficient $\eta_o$. The third calibration resistor may have a third calibration resistance of Rcal3=10 KOhms, and the fourth calibration resistor may have a fourth calibration resistance of Rcal4=1 MOhms. In the step A4, the sensor resistance Rs and the sensor measurement error Rserror is re-calculated for the third calibration resistance Rcal3 and the fourth calibration resistance Rcal4 by using the above-calculated first calibration coefficient/curvature coefficient $\eta_c$.

In step A5, a value of the second calibration coefficient $\eta_o$ is varied and a third calculation error between the third calibration resistance Rcal3 and the resistance determined by the evaluation circuit EC is determined, when the third calibration resistor is applied to the input terminal E of the measurement circuitry MC. Furthermore, the value of the second calibration coefficient $\eta_o$ is varied and a fourth calculation error between the fourth calibration resistance Rcal4 and the resistance determined by the evaluation circuit EC is determined, when the fourth calibration resistor is applied to the input terminal E.

The value of the second calibration coefficient $\eta_o$ is determined such that a sum of the first calculation error and the second calculation error is 0 or almost 0. In the example shown in FIG. 8, the second calibration coefficient/offset coefficient $\eta_o$ is calculated by sweeping $\eta_o$ to satisfy the condition RSerror(10 KOhms)+RSerror(1 MOhms)=0 (or almost 0). The calculated values for the first calibration coefficient $\eta_c$ and the second calibration coefficient $\eta_o$ may be stored in the memory M.

Figure 9:
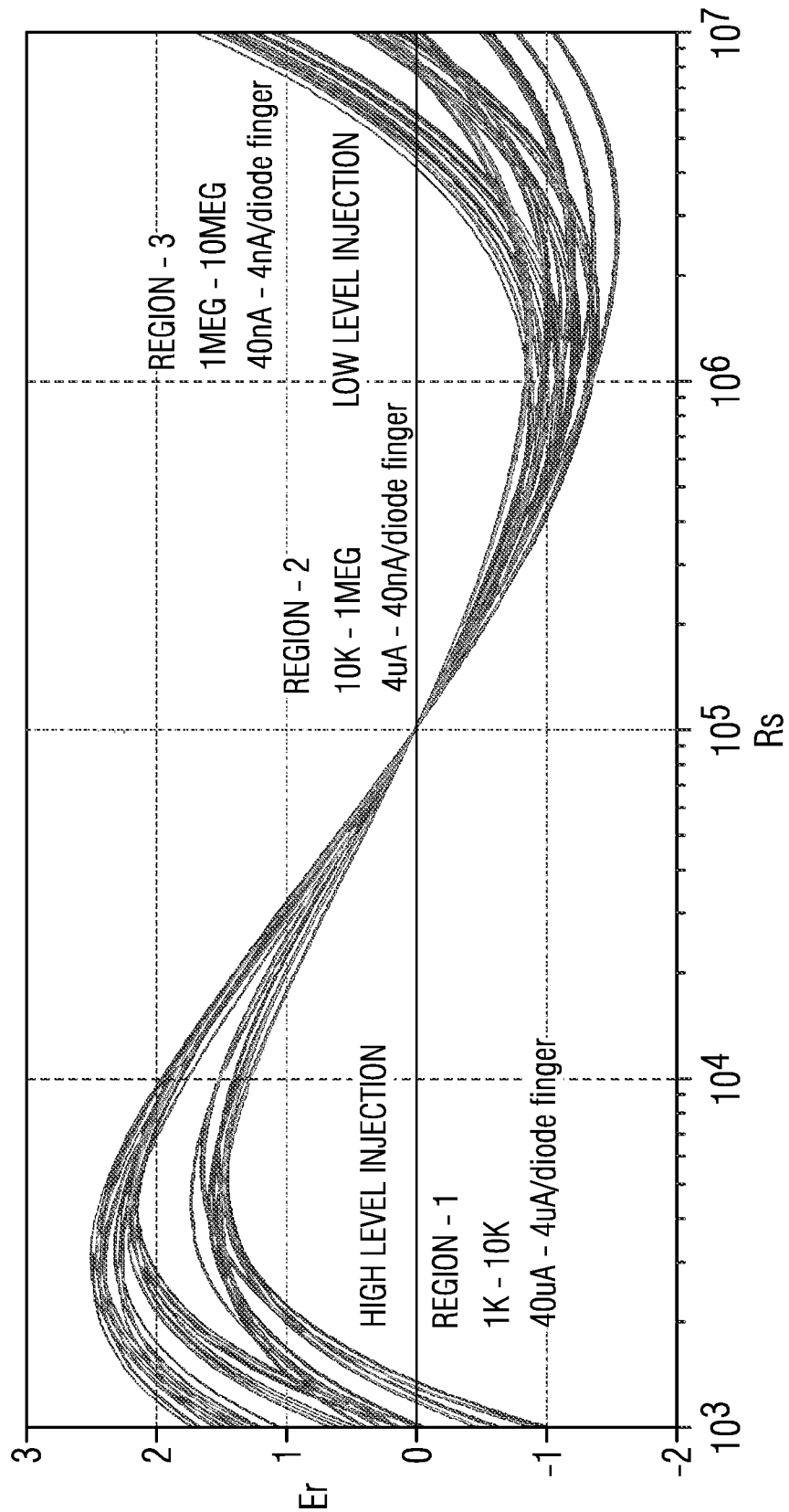
FIG. 9 shows the percentage measurement error for a sensor resistance in a range from 1 Kohms to 10 MOhms using only curvature correction of the ideality factor according to the curvature and offset calibration technique.

FIG. 9 shows the transformation of the curves from FIG. 7 when equation (12) uses the first calibration coefficient $\eta_c$ from the procedure of FIG. 8 and $\eta_o$ is set to "1". Since the errors' curves are corrected only for curvature, the error at a resistance of 100 KOhms is 0. The maximum percentage error ranges from +2.5% to −1.5% for the entire range of the resistance Rs of the resistor Rsensor of the resistive gas sensor from 1 KOhms to 10 MOhms.

Figure 10:
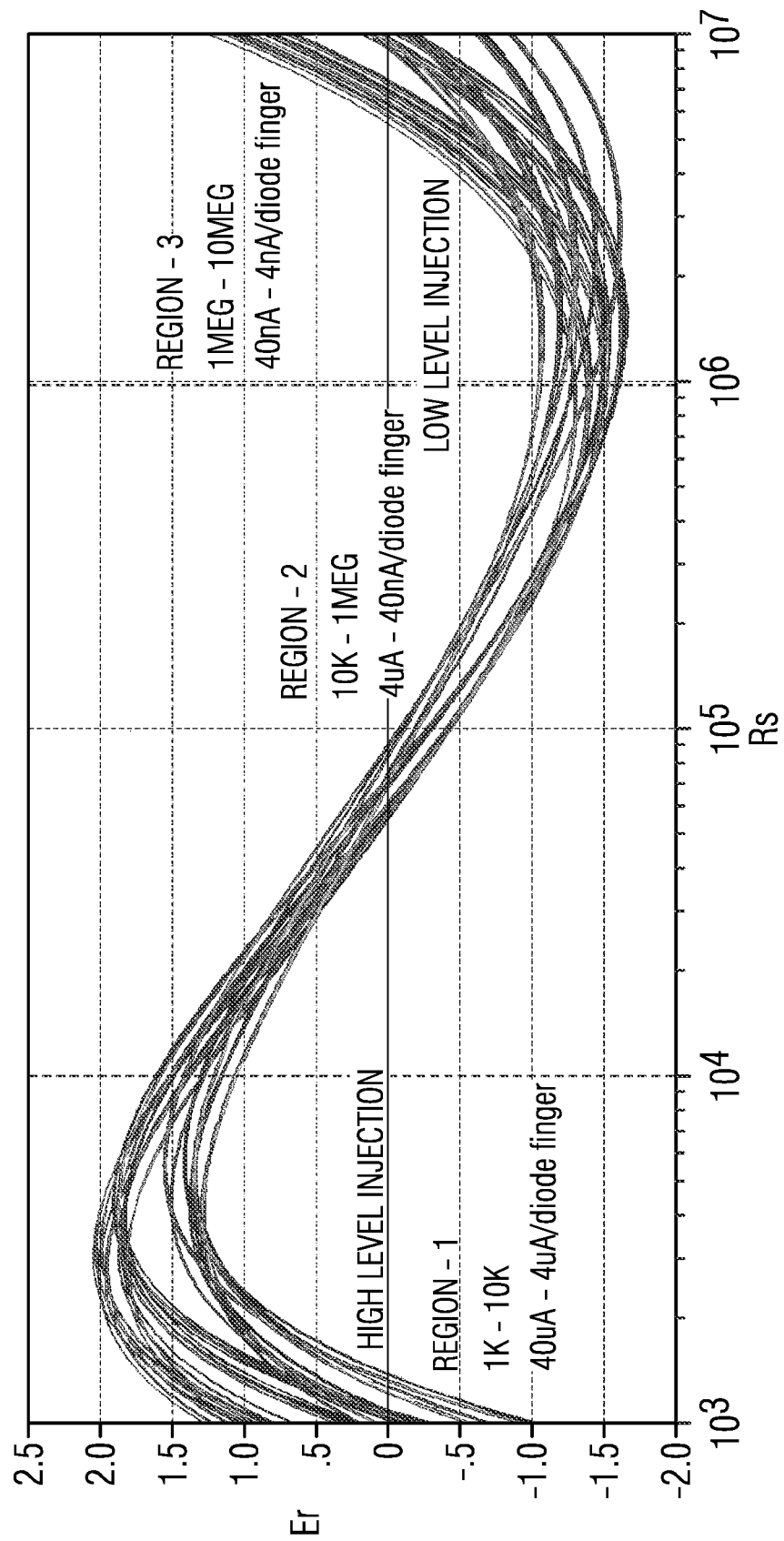
FIG. 10 shows the percentage measurement error for a sensor resistance in a range from 1 Kohms to 10 MOhms using both offset and curvature correction of the ideality factor according to the curvature and offset calibration technique.

In order to make the maximum error numerically same in the positive and negative directions, the second calibration coefficient/offset correction coefficient $\eta_o$ is employed. By computing the resistance Rs using both the first calibration coefficient/curvature coefficient $\eta_c$ and the second calibration coefficient/offset coefficient $\eta_o$, the measurement error Er across the entire sensor resistance range of 1 KOhms to 10 MOhms is obtained as shown in FIG. 10. The positive and negative peak error is now +2% and −1.66%. The single curvature and offset correction approach needs only two calibration coefficients to be calculated and stored in the memory M, for example a non-volatile memory.

Range-Wise Curvature and Offset Correction Technique

In the following, the range-wise curvature and offset correction technique is presented. The range-wise curvature and offset correction strategy involves breaking the entire range of operation of the sensor resistance Rs into different ranges. The range of the resistance Rs of the resistor Rsensor of the resistive sensor GS can be divided in a first resistive range and at least a second resistive range.

The first resistive range extends between a first resistance Rcal11 and a second resistance Rcal12 of the first resistive range. The at least one second resistive range extends between a first resistance Rcal21 and a second resistance Rcal22 of the at least one second resistive range. The deviation of the diodes Q1, Q2, Q3 and Q4 from their ideal characteristic behaviour is corrected by a first set of the first and second calibration coefficient $\eta_{c1}$, $\eta_{o1}$ assigned to the first resistive range and at least a second set of the first and the second calibration coefficient $\eta_{c2}$, $\eta_{o2}$ assigned to the at least one second resistive range.

Figure 11:
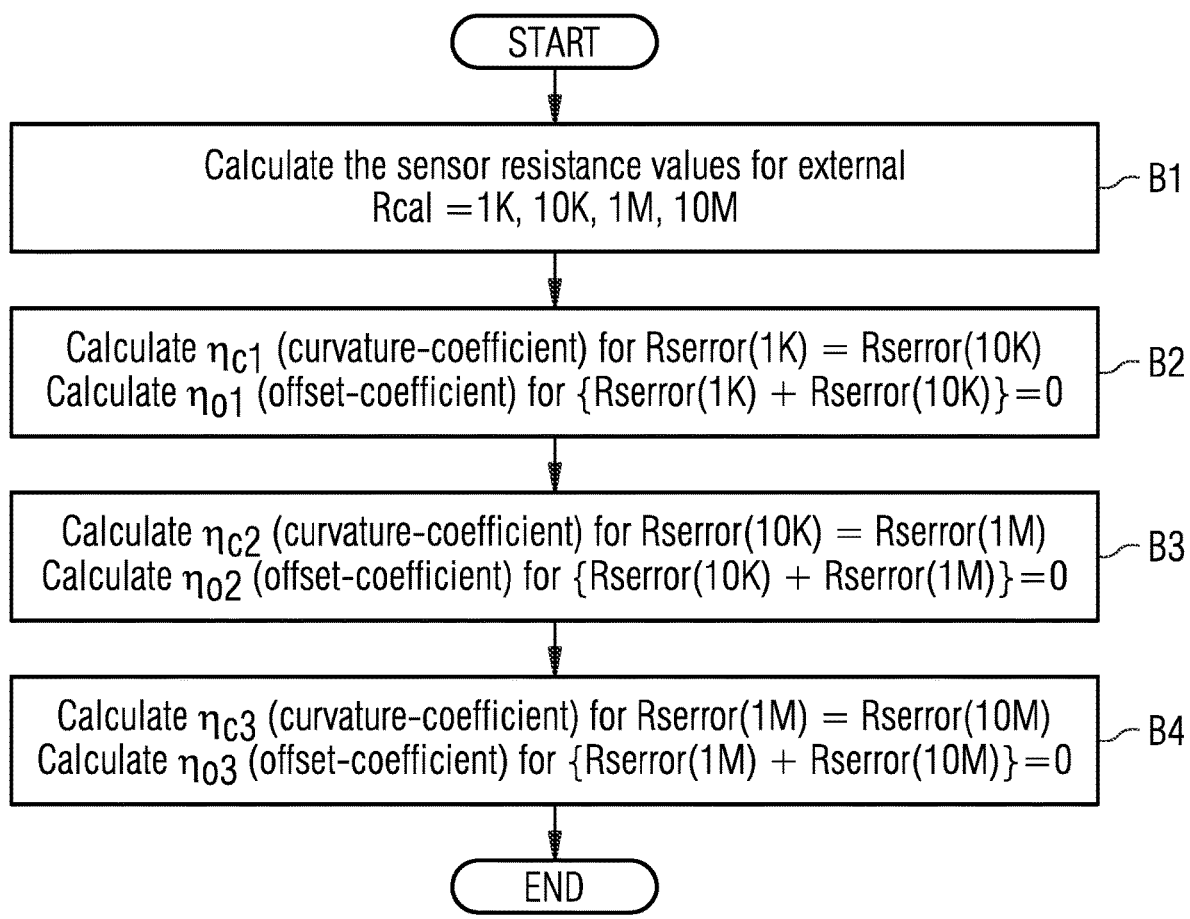
FIG. 11 shows a calibration flow to calculate the coefficients $\eta_c$ and $\eta_o$ for a range-wise curvature and offset calibration technique.

A calibration flow to calculate the first set of the first and second calibration coefficient $\eta_{c1}$, $\eta_{o1}$ and the at least one second set of the first and second calibration coefficient $\eta_{c2}$, $\eta_{o2}$ is shown in FIG. 11.

For determining the first set of the first and second calibration coefficient $\eta_{c1}$, $\eta_{o1}$, in a step B1 of the method, a first calibration resistor having a first calibration resistance Rcal1 being equal to the first resistance R11 of the first resistive range is externally applied to the input terminal E of the measurement circuitry MC. Furthermore, a second calibration resistor having a second calibration resistance Rcal2 being equal to the second resistance R12 of the first resistive range is externally applied to the input terminal E of the measurement circuitry MC. The sensor resistance Rs is calculated by the evaluation circuit EC for each one of the externally applied first and second calibration resistors, wherein the first calibration coefficient/curvature coefficient $\eta_c$ and the second calibration coefficient/offset coefficient $\eta_o$ is chosen as "1".

In step B2, a value of the first calibration coefficient/curvature coefficient $\eta_{c1}$ of the first set of the calibration coefficients is varied and a first calculation error Rserror between the first resistance R11 of the first resistive range and the resistance determined by the evaluation circuit EC is determined, when the first calibration resistor is applied to the input terminal E. Furthermore, in step B2 the value of the first calibration coefficient/curvature coefficient $\eta_{c1}$ of the first set of the calibration coefficients is varied and a second calculation error between the second resistance R12 of the first resistive range and the resistance determined by the evaluation circuit EC is determined, when the second calibration resistor is applied to the input terminal E. The value of the first calibration coefficient/curvature coefficient $\eta_{c1}$ of the first set of calibration coefficients is determined such that the first calculation error is equal or almost equal to the second calculation error.

Furthermore, in step B2, the second calibration coefficient/offset coefficient $\eta_{o1}$ of the first set of the calibration coefficients is determined. A value of the second calibration coefficient/offset coefficient $\eta_{o1}$ of the first set of the calibration coefficients is varied and a third calculation error between the first resistance R11 of the first resistive range and the resistance determined by the evaluation circuit EC is determined, when the first calibration resistor is applied to the input terminal E. Furthermore, the value of the second calibration coefficient/offset coefficient $\eta_{o1}$ of the first set of the calibration coefficients is varied and a fourth calculation error between the second resistance R12 of the first resistive range and the resistance determined by the evaluation circuit EC is determined, when the second calibration resistor is applied to the input terminal E. The value of the second calibration coefficient/offset coefficient $\eta_{o1}$ of first set of the calibration coefficients is determined such that a sum of the third calculation error and the fourth calculation error is 0 or almost 0.

For determining the at least one second set of the first and second calibration coefficient $\eta_{c2}$, $\eta_{o2}$, in step B1, the second calibration resistor having the second calibration resistance Rcal2 is externally applied to the input terminal E of the measurement circuitry MC and a third calibration resistor having a third calibration resistance Rcal3 being equal to the second resistance R22 of the at least one second resistive range is externally applied to the input terminal E of the measurement circuitry MC.

According to step B3, a value of the first calibration coefficient/curvature coefficient $\eta_{c2}$ of the at least one second set of the calibration coefficients is varied and a fifth calculation error between the first resistance R21 of the at least one second resistive range and the resistance determined by the evaluation circuit EC is determined, when the second calibration resistor is applied to the input terminal E of the measurement circuitry. Furthermore, the value of the first calibration coefficient/curvature coefficient $\eta_{c2}$ of the at least one second set of the calibration coefficients is varied and a sixth calculation error between the second resistance R22 of the at least one second resistive range and the resistance determined by the evaluation circuit EC is determined, when the third calibration resistor is applied to the input terminal E of the measurement circuitry. The value of the first calibration coefficient/curvature coefficient $\eta_{c2}$ of the second set of the calibration coefficients is determined such that the fifth calculation error is equal or almost equal to the sixth calculation error.

In order to determine the value of the second calibration coefficient/offset coefficient $\eta_{o2}$ of the at least one second set of the calibration coefficients, a value of the second calibration coefficient $\eta_{o2}$ of the at least one second set of the calibration coefficients is varied and a seventh calculation error between the first resistance R21 of the at least one second resistive range and the resistance determined by the evaluation circuit EC is determined, when the second calibration resistor is applied to the input terminal E of the measurement circuitry. The value of the second calibration coefficient/offset coefficient $\eta_{o2}$ of the at least one second set of the calibration coefficients is varied and an eighth calculation error between the second resistance R22 of the at least one second resistive range and the resistance determined by the evaluation circuit EC is determined, when the third calibration resistor is applied to the input terminal E of the measurement circuitry. The value of the second calibration coefficient/offset coefficient $\eta_{o2}$ of the at least one second set of the calibration coefficients is determined such that a sum of the seventh calculation error and the eighth calculation error is equal or almost equal to 0.

The range-wise curvature and offset correction algorithm is explained in the following by an example, wherein it is assumed that the resistance Rs of the resistor Rsensor of the resistive gas sensor has a range of between 1 KOhms to 10 MOhms and is divided into three smaller ranges. Each smaller range can be 1 decade of the sensor resistance. The first resistive range extends between R11=1 KOhms to R12=10 KOhms, wherein the calibration coefficients for this first set of calibration coefficients are $\eta_{c1}$ and $\eta_{o1}$. The second resistive range extends between R21=10 KOhms to R22=1 MOhms, wherein the calibration coefficients for this second range are $\eta_{c2}$ and $\eta_{o2}$. The third resistive range extends between R31=1 MOhms to R32=10 MOhms, wherein the coefficients for the third resistive range are $\eta_{c3}$ and $\eta_{o3}$.

In the step B1 of the range-wise curvature and offset correction algorithm illustrated in FIG. 11, a first external calibration resistor having the resistance Rcal1=R11, a second external calibration resistor having the resistance Rcal2=R12=R21, a third external calibration resistor having the resistance Rcal3=R22=R31 and a fourth external calibration resistor having the resistance Rcal4=R32 are applied to the input terminal E of the measurement circuitry MC. The three resistive ranges are illustrated in FIG. 13.

The first external calibration resistor of 1 KOhms, the second external calibration resistor of 10 KOhms, the third external calibration resistor of 1 MOhms and the fourth external calibration resistor of 10 MOhms are applied to the input terminal E and the respective resistance Rs is determined by the evaluation circuit EC by equation (12), wherein the curvature correction coefficient $\eta_c$ is chosen equal to 1 and the offset correction coefficient $\eta_o$ is also chosen equal to 1.

In step B2, the first calibration coefficient/curvature coefficient $\eta_{c1}$ and the second calibration coefficient/offset coefficient $\eta_{o1}$, i.e. the first set of calibration coefficients for the first resistive range between 1 KOhms and 10 KOhms, is determined. The first calibration coefficient $\eta_{c1}$ is chosen such that the first calculation error Rserror(1K) for the applied first calibration resistor of 1 KOhms is equal or almost equal to the second calculation error Rserror(10 k) for the applied second calibration resistor of 10 KOhms, i.e. Rserror (1K)~=Rserror (10K). The second calibration coefficient $\eta_{o1}$ is determined such that the sum of the third calculation error Rserror (1 k) and the fourth calculation error Rserror (10 k) is equal or almost equal to 0, i.e. Rserror (1K)+Rserror (10K)~=0.

In the step B3 the first calibration coefficient/curvature coefficient $\eta_{c2}$ and the second calibration coefficient/offset coefficient $\eta_{o2}$ of the second set of calibration coefficients for the second resistive range between 10 KOhms and 1 MOhms is determined. The first calibration coefficient $\eta_{c2}$ is determined such that the fifth calculation error Rserror(10 k) for the applied second calibration resistor of 10 KOhms is equal to the sixth calculation error Rserror(1M) for the applied third calibration resistor of 1 MOhms, i.e. Rserror (10K)~=Rserror(1M). The second calibration coefficient $\eta_{o2}$ of the second set of the calibration coefficients is determined such that the sum of the seventh calculation error Rserror (10K) for the applied second calibration resistor of 10 KOhms and the eighth calculation error Rserror(1M) for the applied third calibration resistor of 1 MOhms is equal or almost equal to 0, i.e. Rserror (10K)+Rserror (1M)~=0.

In a step B4 the first calibration coefficient/curvature coefficient $\eta_{c3}$ and the second calibration coefficient/offset coefficient $\eta_{o3}$ for the third set of calibration coefficients for the third resistive range between 1 MOhms and 10 MOhms is determined. The first calibration coefficient $\eta_{c3}$ is determined such that the calculation error Rserror (1M) for the applied third calibration resistor of 1 MOhms is equal or almost equal to the calculation error Rserror (10M) for the applied fourth calibration resistor of 10 MOhms. The second calibration coefficient $\eta_{o3}$ is determined such that the sum of the calculation RSerror(1M) and the calculation error Rserror(10M) is equal or almost equal to 0, Rserror (1M)+ Rserror (10M)~=0.

Figure 12:
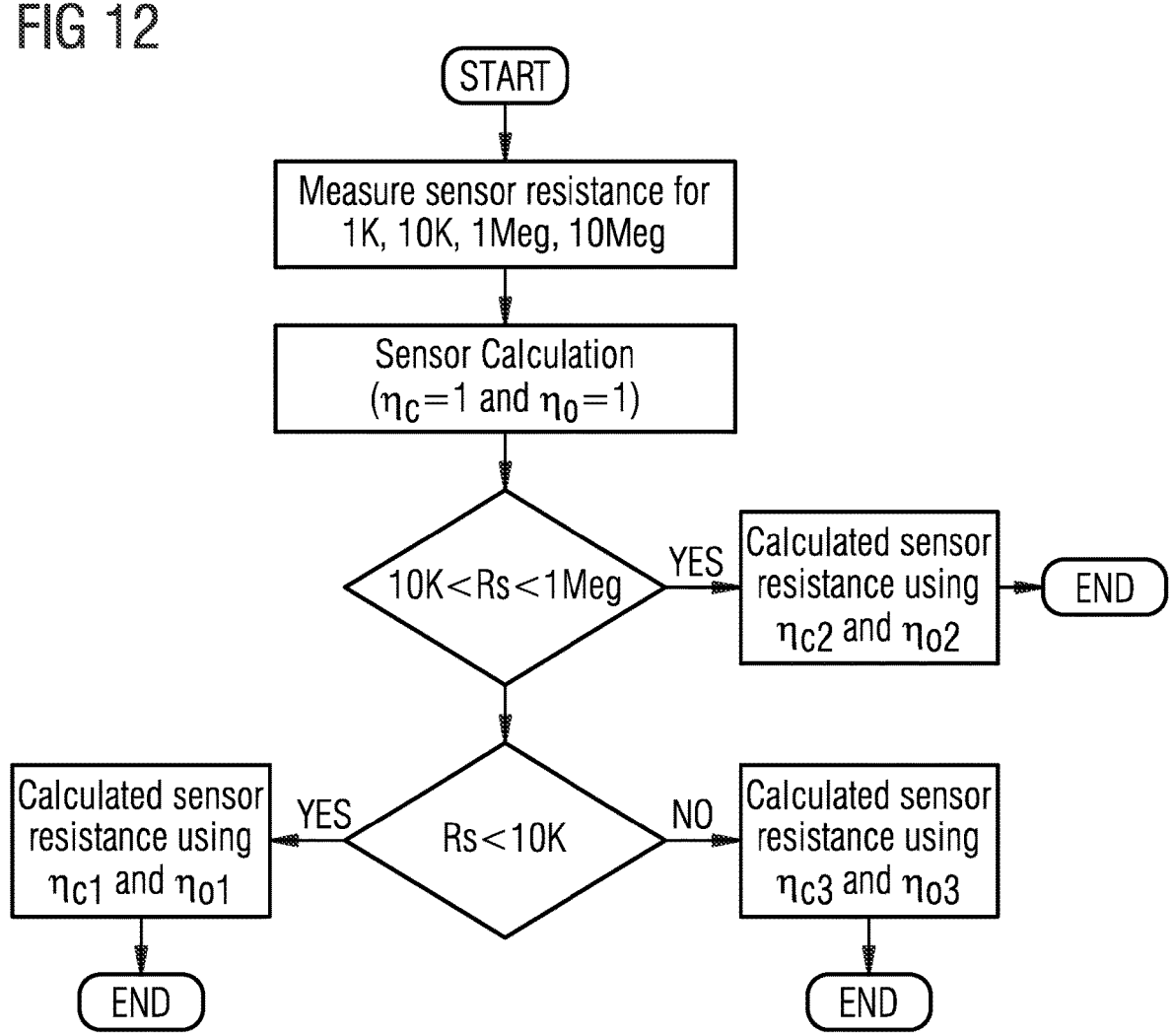
FIG. 12 shows a flow diagram to calculate the resistance Rsensor for a range-wise curvature and offset calibration technique.

FIG. 12 shows a flow diagram to calculate the resistance Rs of the resistor Rsensor of the resistive gas sensor using range-wise curvature and offset correction. After having determined several sets of the first calibration coefficient/curvature coefficient and the second calibration coefficient/offset coefficient for each resistive range, a dedicated set of the first calibration coefficient/curvature coefficient and the second calibration coefficient/offset coefficient is determined is used for the re-computation of the sensor resistance Rs, after the initial computation is done with the default values of $\eta_c=1$ and $\eta_o=1$. The range of the sensor resistance will be determined using initial computation. In dependence on the determined resistive range, a respective set of the first and second calibration coefficient is selected. Then, the final accurate value of the sensor resistance Rs using the corresponding values for the first calibration coefficient and the second calibration coefficient is re-calculated.

FIG. 13 shows the calculation/measurement error Er of the resistance Rs using the range-wise curvature and offset calibration technique.

The range-wise curvature and offset correction technique cannot be used in applications where the measured/calculated resistance Rs needs to be continuous without any discontinuities at the range boundaries. Using range-wise curvature and offset correction will have additional overhead in all the below-mentioned aspects of the design. The approach to use a single curvature and offset coefficient for the entire range of operation may be used to optimize the number of calibration parameters, the number of storage locations in the memory M and digital calculation overhead without significant test time overhead compared to the batch calibration.

The proposed calibration algorithms provide a unique calibration strategy for a logarithmic compression sensor front-end such that it allows a continuous excitation (voltage/current) of a resistive sensor, such as a resistive gas sensor, without any discontinuity. The algorithms further provide the possibility to extend the concepts to piece-wise calibration (re-calculation) instead of piece-wise sensor excitation. The calibration strategies can be applied to any logarithmic sensor to correct for the impact of ideality factor over the entire range of operation. Furthermore, the calibration concepts can be applied to any process variant.

LIST OF REFERENCE SIGNS

GS gas sensor
MC measurement circuitry
Rsensor resistor of the gas sensor
E input terminal/pad
VG voltage generator
LC1, . . . , LC4 logarithmic converter/compression circuit
EC evaluation circuit
Rreference reference resistor
Rs resistance of Rsensor
Rref resistance of Rreference
A1, A2 operational amplifier
Mp1, Mp2, Mp3 driver
Ve1, . . . , Ve4 output signal
DE1, DE2 differentiating element
$V_{in}$ first difference signal
$V_{ktq}$ second difference signal/thermal voltage
C analog to digital converter
Code$_{Vin}$ digital signal of $V_{in}$
Code$_{ktq}$ digital signal of $V_{ktq}$
CU calculation unit
DC1, DC2 detection circuit

The invention claimed is:

1. A measurement circuitry for evaluating a resistance of a resistive gas sensor, comprising:
    an input terminal for connecting the measurement circuitry to the resistive gas sensor,
    a reference resistor,
    a first current path, the input terminal being arranged in the first current path,
    a second current path, the reference resistor being arranged in the second current path,
    a third current path,
    a voltage generator to provide a fixed voltage excitation for the resistive gas sensor and the reference resistor,
    a first logarithmic compression circuit being arranged in the first current path such that, in the case that the resistive gas sensor is connected to the input terminal, a first current received from the resistive gas sensor flows from the resistive gas sensor to the input terminal and via the first current path into the first logarithmic compression circuit,
    a second logarithmic compression circuit being arranged in the second current path such that a second current flowing through the reference resistor flows into the second logarithmic compression circuit,
    a first driver, the first driver being arranged in the first current path between the input terminal of the measurement circuitry and the first logarithmic compression circuit,
    an evaluation circuit to determine the resistance of the resistive gas sensor,
    wherein the first logarithmic compression circuit is configured to generate a first output signal in dependence on the first current,
    wherein the second logarithmic compression circuit is configured to generate a second output signal in dependence on the second current,
    wherein the evaluation circuit is configured to determine the resistance of the resistive gas sensor in dependence on the first and second output signal;
    wherein the first logarithmic compression circuit is arranged in a common branch of the first current path and the third current path.

2. The measurement circuitry of claim 1,
wherein the evaluation circuit is configured to determine the resistance of the resistive gas sensor in dependence on a ratio of a thermal voltage of the measurement circuitry and the difference between the first output signal and the second output signal.

3. The measurement circuitry of claim 1, comprising:
a first fixed voltage line to provide one of a supply potential and a ground potential,
an internal node being arranged in the second current path,
wherein the reference resistor is arranged between the first fixed voltage line and the internal node.

4. The measurement circuitry of claim 3, comprising:
a first operational amplifier having a first input to apply an excitation voltage and a second input,
a second operational amplifier having a first input to apply the excitation voltage and a second input,
wherein the second input of the first operational amplifier is connected to the input terminal of the measurement circuitry,
wherein the second input of the second operational amplifier is connected to the internal node.

5. The measurement circuitry of claim 3, comprising:
a second driver,
wherein the second driver is arranged in the second current path between the internal node of the measurement circuitry and the second logarithmic compression circuit,
wherein the first driver is controlled by the first operational amplifier and the second driver is controlled by the second operational amplifier.

6. The measurement circuitry of claim 3, comprising:
a second fixed voltage line to provide one of the supply potential and the ground potential,
wherein the second fixed voltage line is configured to provide the ground potential, when the first fixed voltage line provides the supply potential, and to provide the supply potential, when the first fixed voltage line provides the ground potential,
wherein the second current path is arranged between the first and the second fixed voltage line,
wherein the first logarithmic compression circuit is arranged between the input terminal of the measurement circuitry and the second fixed voltage line,
wherein the second logarithmic compression circuit is arranged between the internal node of the measurement circuitry and the second fixed voltage line.

7. The measurement circuitry of claim 6, comprising:
another reference resistor being arranged in the third current path,
wherein the third current path is arranged between the first and second fixed voltage line,
a third driver being arranged in the third current path between the other reference resistor and the first logarithmic compression circuit,
wherein the third driver is controlled by the first operational amplifier.

8. The measurement circuitry of claim 7, comprising:
a first controllable switch being arranged between the input terminal of the measurement circuitry and the second input of the first operational amplifier,
a second controllable switch being arranged between the second input of the first operational amplifier and the third current path,
a third controllable switch being arranged between an output of the first operational amplifier and a control terminal of the first driver,
a fourth controllable switch being arranged between an output of the first operational amplifier and a control terminal of the third driver.

9. The measurement circuitry of claim 8, comprising:
a control circuit to control the first and second and third and fourth controllable switch,
wherein the control circuit is configured to operate the first and the third controllable switch in a respective conductive state and to operate the second and the fourth controllable switch in a non-conductive state to perform a first measurement of the respective level of the first and the second output signal,
wherein the evaluation circuit is configured to calculate a first difference signal having a level in dependence on a difference between the respective level of the first output signal and the second output signal measured during the first measurement,
wherein the control circuit is configured to operate the second and the fourth controllable switch in a respective conductive state and to operate the first and third controllable switch in a non-conductive state to perform a second measurement of the respective level of the first and the second output signal,
wherein the evaluation circuit is configured to calculate a second difference signal having a level in dependence on a difference between the respective level of the first and second output signal measured during the second measurement,
wherein the evaluation circuit is configured to determine the resistance of the resistive gas sensor in dependence on the relationship between the first difference signal and the second difference signal.

10. The measurement circuitry of claim 6, comprising
a third current path and a fourth current path being connected between the first and the second fixed voltage line,
a current mirror to provide a third current in the third current path and a fourth current in the fourth current path, the fourth current being N times larger than the third current,
a third logarithmic compression circuit to provide a third output signal, the third logarithmic compression circuit being arranged in the third current path,
a fourth logarithmic compression circuit to provide a fourth output signal, the fourth logarithmic compression circuit being arranged in the fourth current path.

11. The measurement circuitry of claim 10,
wherein the evaluation circuit is configured to calculate a first difference signal having a level in dependence on a difference between the respective level of the first and second output signal and to calculate a second difference signal having a level in dependence on a difference between the respective level of the third and the fourth output signal,
wherein the evaluation circuit is configured to determine the resistance of the resistive gas sensor in dependence on the relationship between the first difference signal and the second difference signal.

12. The measurement circuitry of claim 1, comprising:
a detection circuit to detect a disconnection of the resistive gas sensor from the input terminal of the measurement circuitry,
wherein the detection circuit is configured as a voltage/current comparator being connected to the output of the first operational amplifier and being configured to generate its reference voltage based on the output voltage of the first operational amplifier, or
wherein the detection circuit is configured as a comparator having a first input connection being connected to the output of the first operational amplifier and having a second input connection to apply an on-chip reference voltage generated on the chip comprising the measurement circuitry.

* * * * *